United States Patent
Qi et al.

(10) Patent No.: US 10,694,550 B2
(45) Date of Patent: Jun. 23, 2020

(54) APPARATUS AND METHOD FOR INITIAL ACCESS IN WIRELESS COMMUNICATION SYSTEM

(71) Applicant: Samsung Electronics Co., Ltd., Gyeonggi-do (KR)

(72) Inventors: Yinan Qi, Staines (GB); Maziar Nekovee, Staines (GB)

(73) Assignee: Samsung Electronics Co., Ltd., Suwon-si (KR)

( * ) Notice: Subject to any disclaimer, the term of this patent is extended or adjusted under 35 U.S.C. 154(b) by 194 days.

(21) Appl. No.: 15/400,602

(22) Filed: Jan. 6, 2017

(65) Prior Publication Data

US 2017/0202029 A1    Jul. 13, 2017

(30) Foreign Application Priority Data

Jan. 8, 2016  (GB) .................................. 1600337.8

(51) Int. Cl.
*H04W 74/08* (2009.01)
*H04W 48/20* (2009.01)
(Continued)

(52) U.S. Cl.
CPC ....... *H04W 74/0833* (2013.01); *H04W 48/20* (2013.01); *H04W 56/001* (2013.01);
(Continued)

(58) Field of Classification Search
CPC .................................................... H04W 64/00
See application file for complete search history.

(56) References Cited

U.S. PATENT DOCUMENTS

2001/0023185 A1\* 9/2001 Hakkinen ............... H04B 7/022
455/434
2001/0034236 A1\* 10/2001 Tong ..................... H04W 16/28
455/450
(Continued)

FOREIGN PATENT DOCUMENTS

| KR | 1020140136630 A | 12/2014 |
| KR | 1020150132200 A | 11/2015 |
| WO | 2014009250 A1 | 1/2014 |

OTHER PUBLICATIONS

3GPP, "The Mobile Broadband Standard Edge," Release 13, Dec. 13, 2016, 2 pages, available at http://www.3gpp.org/release-13.
(Continued)

*Primary Examiner* — Alpus Hsu
*Assistant Examiner* — Camquyen Thai

(57) ABSTRACT

The present disclosure relates to a pre-5th-Generation (5G) or 5G communication system to be provided for supporting higher data rates Beyond 4th-Generation (4G) communication system such as Long Term Evolution (LTE). The present disclosure provides a method of operating a base station in a wireless communication system includes receiving, from a terminal, a first random access signal transmitted by a plurality of transmit beams of the terminal, determining a receive beam based on a signal strength of the first random access signal, receiving, from the terminal, a second random access signal transmitted by the plurality of transmit beams of the terminal using the receive beam, and establishing a connection between the terminal and the base station based on a signal strength of the second random access signal.

15 Claims, 23 Drawing Sheets

(51) Int. Cl.

| | | |
|---|---|---|
| *H04W 76/10* | (2018.01) | |
| *H04W 56/00* | (2009.01) | |
| *H04W 64/00* | (2009.01) | |
| *H04W 72/08* | (2009.01) | |
| *H04W 16/28* | (2009.01) | |
| *H04W 88/02* | (2009.01) | |
| *H04W 88/08* | (2009.01) | |

(52) U.S. Cl.
CPC ......... *H04W 64/00* (2013.01); *H04W 72/085* (2013.01); *H04W 76/10* (2018.02); *H04W 16/28* (2013.01); *H04W 88/02* (2013.01); *H04W 88/08* (2013.01)

(56) References Cited

U.S. PATENT DOCUMENTS

| | | | | |
|---|---|---|---|---|
| 2002/0002066 | A1* | 1/2002 | Pallonen | H04W 64/00 455/562.1 |
| 2002/0034943 | A1* | 3/2002 | Pallonen | H01Q 3/24 455/424 |
| 2005/0124353 | A1 | 6/2005 | Cave | |
| 2006/0223573 | A1* | 10/2006 | Jalali | H04W 36/0055 455/552.1 |
| 2007/0105566 | A1 | 5/2007 | Sharony et al. | |
| 2008/0096546 | A1* | 4/2008 | Guo | H04W 16/28 455/424 |
| 2010/0285811 | A1* | 11/2010 | Toda | H04W 48/10 455/452.1 |
| 2011/0032849 | A1* | 2/2011 | Yeung | H04B 7/0434 370/280 |
| 2011/0182375 | A1* | 7/2011 | Kim | H04W 72/0426 375/260 |
| 2011/0305180 | A1* | 12/2011 | Osterling | H04W 74/006 370/311 |
| 2012/0052828 | A1* | 3/2012 | Kamel | H04B 7/0408 455/226.2 |
| 2012/0202431 | A1* | 8/2012 | Hawryluck | H04B 7/024 455/63.4 |
| 2013/0053079 | A1* | 2/2013 | Kwun | H04B 7/024 455/509 |
| 2013/0072244 | A1* | 3/2013 | Jeong | H04B 7/0617 455/509 |
| 2013/0102345 | A1* | 4/2013 | Jung | H04B 7/0456 455/513 |
| 2013/0286960 | A1* | 10/2013 | Li | H04W 72/042 370/329 |
| 2013/0301567 | A1 | 11/2013 | Jeong et al. | |
| 2014/0003369 | A1 | 1/2014 | Josiam et al. | |
| 2014/0148182 | A1* | 5/2014 | Jeong | H04L 5/0026 455/452.1 |
| 2014/0213249 | A1* | 7/2014 | Kang | H04W 28/18 455/434 |
| 2014/0254515 | A1* | 9/2014 | Kim | H04W 74/0833 370/329 |
| 2014/0348051 | A1 | 11/2014 | Park et al. | |
| 2015/0201368 | A1* | 7/2015 | Cudak | H04W 48/12 370/329 |
| 2016/0029358 | A1 | 1/2016 | Hou et al. | |
| 2016/0044517 | A1* | 2/2016 | Raghavan | H04W 16/28 370/329 |
| 2016/0057674 | A1* | 2/2016 | Takeda | H04W 48/20 370/332 |
| 2016/0192401 | A1* | 6/2016 | Park | H04W 74/0833 370/329 |
| 2017/0055298 | A1* | 2/2017 | Pawar | H04L 5/1469 |

OTHER PUBLICATIONS

Intellectual Property Office, "Combined Search and Examination Report," Application No. GB1600337.8, dated Jun. 23, 2016, 5 pages, publisher IPO, Newport South Wales.

Ju-Lan Hsu, "Directional random access scheme for mobile ad hoc networking using beamforming antennas," 2006, 27 pages, publisher Elsevier B.V., Amsterdam, The Netherlands.

3GPP TS 36.300 V13.1.0, "3rd Generation Partnership Project; Technical Specification Group Radio Access Network; Evolved Universal Terrestrial Radio Access (E-UTRA) and Evolved Universal Terrestrial Radio Access Network," Overall description; Stage 2, (Release 13), 2015, 257 pages, publisher 3GPP Organizational Partners (ARIB, ATIS, CCSA, ETSI, TSDSI, TTA, TTC), Sophia Antipolis Valbonne—France.

ISA/KR, "International Search Report," Application No. PCT/KR2017/000199, dated Apr. 20, 2017, Korean Intellectual Property Office, Daejeon, Korea, 4 pages.

ISA/KR, "Written Opinion of the International Searching Authority," Application No. PCT/KR2017/000199, dated Apr. 20, 2017, Korean Intellectual Property Office, Daejeon, Korea, 6 pages.

* cited by examiner

APPARATUS AND METHOD FOR INITIAL ACCESS IN WIRELESS COMMUNICATION SYSTEM

CROSS-REFERENCE TO RELATED APPLICATION(S) AND CLAIM OF PRIORITY

The present application is related to and claims the priority under 35 U.S.C. § 119(a) of United Kingdom patent application filed in the United Kingdom Intellectual Property Office on Jan. 8, 2016, and assigned Serial No. 1600337.8, the entire disclosure of which is hereby incorporated by reference.

TECHNICAL FIELD

The present disclosure relates to an initial access method in wireless communication system, more particularly, to an initial access method between a terminal and at least one base station.

BACKGROUND

To meet the demand for wireless data traffic having increased since deployment of 4th generation (4G) communication systems, efforts have been made to develop an improved 5th generation (5G) or pre-5G communication system. Therefore, the 5G or pre-5G communication system is also called a 'Beyond 4G Network' or a 'Post LTE System'.

The 5G communication system is considered to be implemented in higher frequency (mmWave) bands, e.g., 60 GHz bands, so as to accomplish higher data rates. To decrease propagation loss of the radio waves and increase the transmission distance, the beamforming, massive multiple-input multiple-output (MIMO), Full Dimensional MIMO (FD-MIMO), array antenna, an analog beam forming, large scale antenna techniques are discussed in 5G communication systems.

In addition, in 5G communication systems, development for system network improvement is under way based on advanced small cells, cloud Radio Access Networks (RANs), ultra-dense networks, device-to-device (D2D) communication, wireless backhaul, moving network, cooperative communication, Coordinated Multi-Points (CoMP), reception-end interference cancellation and the like.

In the 5G system, Hybrid FSK and QAM Modulation (FQAM) and sliding window superposition coding (SWSC) as an advanced coding modulation (ACM), and filter bank multi carrier (FBMC), non-orthogonal multiple access (NOMA), and sparse code multiple access (SOMA) as an advanced access technology have been developed.

Before a UE and a mobile network access point can communicate, the UE must first connect to the network. A random-access channel (RACH) is a shared channel used by UEs to access the mobile network, without requiring prior knowledge of the network. For the example of an LTE UE, there can be many frequencies available through which the UE could connect to multiple network operators. The UE must synchronize to each frequency in turn to establish it corresponds to an appropriate operator. This is achieved through an initial synchronisation process. Once synchronized to a particular frequency, the UE can determine whether it corresponds to an appropriate operator through the master information and System information blocks transmitted periodically by each network. The next step is known as the Random Access Procedure which allows the network to identify that a UE is trying to connect. The first message of the random access procedure comprises the UE sending a specific RACH preamble over the shared RACH. The identity of the UE is also transmitted. If the RACH preamble is received by the LTE base station (the evolved Node B, eNB) it sends a random access response including an uplink grant resource for further communication between the UE and the eNB, specifically for the transmission of a Radio Resource Control (RRC) Connection Request message by the UE in which the UE seeks permission to connect to the network.

In a conventional cellular scenario, such as LTE, the antenna pattern of the base station is sectorized and the antenna pattern of the UE is most likely omnidirectional. Therefore, the reception of the random access preamble sent by the UE (within an RA Channel, RACH) is principally affected by the distance between the eNB and the UE. In a mm-wave network, due to the hostile propagation conditions (severe path loss and vulnerability to blockage), beam-foilling transmission is employed at both the mmSC and the UE to tackle the increased path loss. However, the high directivity in mm-wave technologies makes the conventional design of initial access procedures (such as for LTE based on broadcast signals) unsuitable. Therefore, for a mm-wave initial access procedure there is a need to pair the beams of a mmSC and a UE, which may take a considerable amount of time.

SUMMARY

To address the above-discussed deficiencies, it is a primary object to provide a coordinated initial access scheme for standalone mm-wave networks. Certain embodiments of the disclosure significantly reduce the beam discovery time of the initial access procedure, enhance the robustness against signal blockage in both line of sight (LOS) and non-line of sight (NLOS) situations, and reduce the cost and complexity of the UE. Certain embodiments of the disclosure facilitate the establishment of asymmetric uplink and downlink, and multiple connections.

Advantageously, the present disclosure allows for efficient and fast initial access for a UE to a standalone mm-wave network without requiring the presence of an overlaid legacy network operating on a lower frequency.

According to a first aspect of the present disclosure there is provided an initial access method in a wireless communications network comprising a cluster of at least three base stations arranged to communicate with a mobile terminal using directional beams, the method comprising transmitting a random access signal from the mobile terminal through a first sweep comprising a plurality of mobile terminal transmission beams; measuring at three or more base stations, each operating a single base station reception beam during the measurements, a power level of the received random access signal from the mobile terminal for the plurality of mobile terminal transmission beams in the first sweep, selecting, for at least one base station, a base station reception beam on the basis of the measurement results, transmitting a random access signal from the mobile terminal through a second sweep comprising the plurality of mobile terminal transmission beams while the at least one base station operates a selected base station reception beam; and establishing an uplink connection between the mobile terminal and one of the base stations if that base station receives the random access signal from the mobile terminal with a power level above a first threshold.

The method may further comprise estimating the location of the mobile terminal based upon the measurement results, wherein the base station reception beam is selected on the basis of the estimated location of the mobile terminal.

The method may further comprise selecting a subset of base station reception beams on the basis of the measurement results, and transmitting a random access signal from the mobile terminal through further sweeps comprising the plurality of mobile terminal transmission beams while the at least one base station operates in turn each one of the selected subset of base station reception beams.

The method may further comprise synchronising the transmission of the random access signal from the mobile terminal according to a synchronisation signal transmitted by one or more base stations.

The method may further comprise measuring the power level of the received random access signal from the mobile terminal at a plurality of base stations, and selecting, for at least one base station, a base station reception beam on the basis of a subset of the measurement results for three or more of base stations.

The method may further comprise transmitting the measurement results from each base station to the other base stations or to a separate network component, wherein a base station reception beam is selected for at least one base station, at each base station on the basis of received and measured measurement results, at a single base station on the basis of received and measured measurement results, the selected base station reception beam being transmitted to at least one other base station; or at the separate network component, the selected base station reception beam being transmitted to at least one base station.

The cluster of base stations may be directly connected via backhaul links for communicating measurement results.

If no base station receives the random access signal in the second sweep from the mobile terminal with a power level above the first threshold, the method may further comprise measuring at three or more base stations, each operating a selected base station reception beam, a power level of the received random access signal from the mobile terminal for the plurality of mobile terminal transmission beams in the second sweep, selecting, for at least one base station, a further base station reception beam on the basis of the measurement results, transmitting a random access signal from the mobile terminal through a third sweep comprising the plurality of mobile terminal transmission beams while the at least one base station operates a further selected base station reception beam, and establishing an uplink connection between the mobile terminal and one of the base stations if that base station receives the random signal from the mobile terminal with a power level above the first threshold.

According to a second aspect of the present disclosure there is provided a method of operating a base station in a wireless communications network comprising a cluster of at least three base stations arranged to communicate with a mobile terminal using directional beams, the method comprising: receiving a random access signal from the mobile terminal through a single sweep comprising a plurality of mobile terminal transmission beams while operating a first base station reception beam; measuring a power level of the received random access signal from the mobile terminal for the plurality of mobile terminal transmission beam in the first sweep; obtaining a selection of a base station reception beam on the basis of the measurement results; receiving a random access signal from the mobile terminal through a second sweep comprising the plurality of mobile terminal transmission beams while operating the selected base station reception beam; and establishing an uplink connection between the mobile terminal and the base station if the random signal is received from the mobile terminal with a signal strength above a first threshold.

Obtaining a selection of a base station reception beam may comprise: transmitting the measurement results to at least two further base stations in the cluster, or to a separate network component, and receiving an estimate of the location of the mobile terminal or a selection of a base station reception beam; or transmitting the measurement results to at least two further base stations in the cluster, receiving corresponding measurement results from at least two further base stations in the cluster and selecting a base station reception beam based upon the received and measured measurement results.

According to a third aspect of the present disclosure there is provided a base station arranged to perform the above method.

Another aspect of the present disclosure provides a computer program comprising instructions arranged, when executed, to implement a method and/or apparatus in accordance with any one of the above-described aspects. A further aspect provides machine-readable storage storing such a program.

Before undertaking the DETAILED DESCRIPTION below, it may be advantageous to set forth definitions of certain words and phrases used throughout this patent document: the terms "include" and "comprise," as well as derivatives thereof, mean inclusion without limitation; the term "or," is inclusive, meaning and/or; the phrases "associated with" and "associated therewith," as well as derivatives thereof, may mean to include, be included within, interconnect with, contain, be contained within, connect to or with, couple to or with, be communicable with, cooperate with, interleave, juxtapose, be proximate to, be bound to or with, have, have a property of, or the like; and the term "controller" means any device, system or part thereof that controls at least one operation, such a device may be implemented in hardware, firmware or software, or some combination of at least two of the same. It should be noted that the functionality associated with any particular controller may be centralized or distributed, whether locally or remotely. Definitions for certain words and phrases are provided throughout this patent document, those of ordinary skill in the art should understand that in many, if not most instances, such definitions apply to prior, as well as future uses of such defined words and phrases.

BRIEF DESCRIPTION OF THE DRAWINGS

For a more complete understanding of the present disclosure and its advantages, reference is now made to the following description taken in conjunction with the accompanying drawings, in which like reference numerals represent like parts.

DETAILED DESCRIPTION

Figure 1A:
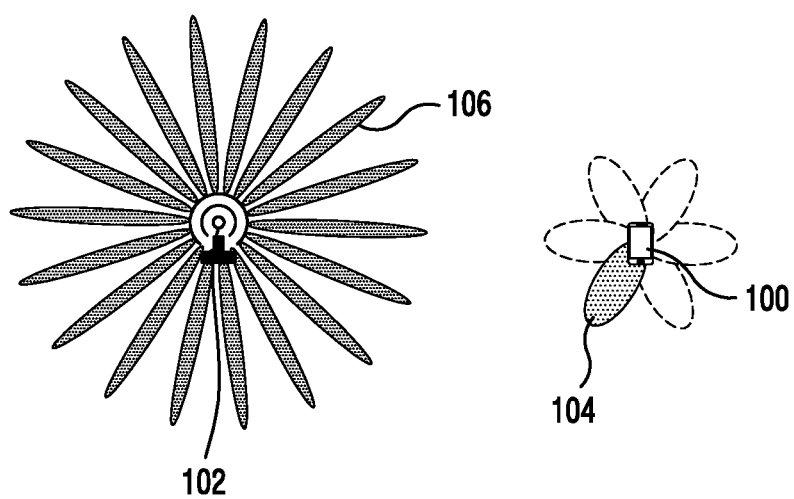
FIG. 1A illustrates a UE performing an initial access procedure with a single mmSC.

FIGS. 1A through 17, discussed below, and the various embodiments used to describe the principles of the present disclosure in this patent document are by way of illustration only and should not be construed in any way to limit the scope of the disclosure. Those skilled in the art will understand that the principles of the present disclosure may be implemented in any suitably arranged electronic device.

This disclosure relates to an Initial Access (IA) method in a wireless communications network comprising a cluster of at least three base stations arranged to communicate with a mobile terminal using directional beams. In particular, certain embodiments of the disclosure to a coordinated initial access method conducted through a Random Access (RA) procedure in such a wireless communications network. In particular, certain embodiments of the present disclosure relate to an initial access method that allows for coordinated initial access for a mobile terminal in a standalone millimetre wave (mm-wave) wireless communication network. The standalone millimetre wave wireless communication network may comprise a cluster of millimetre wave small cells (mmSC) such as have been proposed for Fifth Generation (5G) mobile communication networks. A millimetre wave wireless communication network comprises a network in which communication between a mobile terminal and a network access point take place through directional beams in the Extremely High Frequency (EHF) band (roughly in the 30-300 GHz range), such as an unlicensed 60 GHz band.

There are two important key performance indicators to evaluate the efficiency of an initial access method in a mm-wave wireless communications network: firstly, the beam scan delay occurring between the request to access the channel and its completion, and secondly the beam scan overhead. Without any prior knowledge about the UE (for instance, location), efficient reception beam-forming by mmSCs during the initial access method is hindered and the beam scan delay can easily be prohibitive considering the fact that exhaustive searching requires each beam transmission/reception pair to be examined. For example, if there are $N_{rx}$ beams at the mmSC and $N_{tx}$ beams at the UE, the initial access time might go up to $N_{rx}N_{tx}T_{RA}$, where $T_{RA}$ is the examining time for one beam pair.

One known approach to reduce the initial access time is to combine the mm-wave network with an overlaid conventional cellular network such as LTE. The UE is assumed to have dual RF interfaces for the LTE link and the mm-wave link respectively. It is clear that there is a cost overhead associated with this requirement for dual RF interfaces. The LTE network may be accessed in a conventional fashion in which the UE connects to an LTE macro cell, and the LTE network may be used to disseminate beam sequence information to the UE and the mmSCs to establish effective beam pairs. The initial access procedure is facilitated by splitting out the user plane and the control plane and locating the control plane in the overlaid legacy LTE network where the control signalling and context information of a UE can be conveyed. The user plane is located in the mmSC network. As and when the UE requires high rate data transmission, the UE establishes connections with one or multiple mmSCs. In order to do so, the UE measures the downlink channel from one or more mmSC using reference signals transmitted by the mmSC and generates a measurement report. When the initial access procedure (for accessing an mmSC) is initiated, the UE sends the measurement report to the LTE macro cell via the established LTE link. Based on the measurement reports, the LTE macro cell sends a recommended reception beam set to the mmSC via backhaul links. The mmSCs then reorder the reception beams to put the recommended beams in the forepart when sweeping (that is, to ensure that the recommended beams are swept first). The initial access time is reduced at the cost of significantly increased signalling overhead and increasing the hardware complexity of the network and the UE.

Embodiments of the present disclosure will now be described in the context of a standalone mm-wave wireless communications network. It will be understood that the present disclosure is not limited to any particular radio access technology beyond the use of mm-wave directional beams. The term "base station" may be used to refer to any network component, such as a mmSC capable of communicating with a UE using a directional beam pair.

Referring to FIG. 1A, this shows a single UE 100 and a single mmSC 102 in a standalone mm-wave network. The initial access procedure comprises the UE transmits a random access (RA) preamble through beams 104 and the mmSC receives the RA preamble through beams 106. For the present purposes the UE 100 will be considered to transmit through only a single beam 104 at a time and the mmSC 102 will be considered to only receive signals through a single beam 106 at a time. As such, only a single UE transmission beam is shown shaded, comprising the currently operated transmission beam, which can be examined by the mmSC, and the remaining transmission beams are shown dashed. It will be appreciated that there can be more or fewer transmission beams. As can be seen, the UE 100 needs to conduct a full transmission beam sweep for a given mmSC reception beam 106, and each possible reception beam 106 is used to examine the UE transmission beam sweep. It is assumed that the UE transmission beam sweep is synchronised to the mmSC reception beams through the UE monitoring the downlink synchronisation channel (SCH) prior to beginning uplink random access. There is no requirement that a downlink channel has been established, only that the SCH is monitored for synchronisation. During each UE transmission beam sweep, it is assumed that the mmSC reception beam 106 does not change. This exhaustive beam sweep method not only causes a very long initial access time ($N_{tx}N_{rx}T_{RA}$ as noted above), it also introduces significant beam scan overhead. Moreover, the repeated transmission of RA preambles increases the energy consumption for the UE and thus might easily drain the battery of the UE, which will typically be a portable device. For simplicity, the example of FIG. 1A assumes predefined codebooks at the mmSC and the UE in which the number, shape and orientation of transmission and reception beams is predefined. The skilled person will readily understand how the example of FIG. 1A and the exhaustive search procedure described above can be extended to cover the case that the mmSC and the UE can adaptively steer their beam direction and width.

Figure 1B:
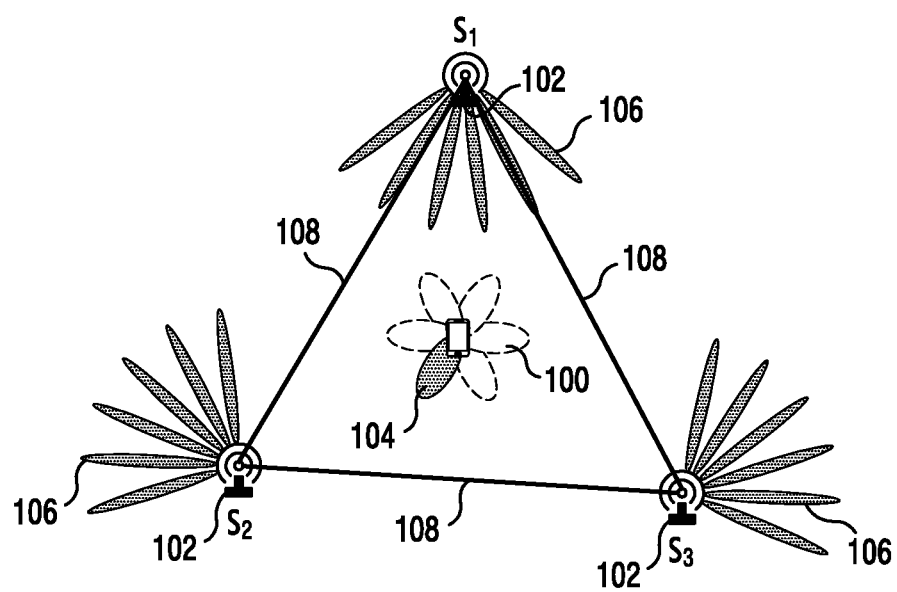
FIG. 1B illustrates a UE performing an initial access procedure with a cluster of mmSCs.

FIG. 1B illustrates an extension to FIG. 1A considering the case in which there is a dense deployment of mmSCs 102 and the UE 100 can communicate with any one of the mmSCs 102. The mmSCs 102 can be clustered based on certain pre-determined sets, for instance according to proximity, and the mmSCs 102 within each cluster are connected via backhaul links. FIG. 1B shows an illustration of a mm-wave initial access procedure between a single UE 100 and a coordinating cluster of three mmSCs 102 ($S_1$, $S_2$, $S_3$) connected via backhaul links 108. It will be appreciated that each mmSC can also participate in neighboring clusters, being formed at the apexes of a grid of clusters. Again, it is assumed that during each full scan of UE transmission beams the mmSC reception beams do not change through synchronization using the downlink synchronization channel. The backhaul links 108 can be any suitable communication link, including conventional wired or wireless links. If the mmSCs 102 share their location and beam scan information via the backhaul links 108 with extremely small latency, there is a possibility that their reception beam sweep procedures can be coordinated jointly to accelerate the initial access procedure. Each mmSC 102 knows the location and selected reception beams of the other two mmSCs 102, for a given UE transmission beam, and so in order to effectively scan the space between the cluster of three mmSCs only a single mmSC 102 ($S_1$) needs to sweep one third of the total reception beam searching space. This is illustrated in FIG. 1B by each mmSC 102 being shown illustrated with only a third of the possible reception beams compared with the illustration of FIG. 1A, $S_2$ and $S_3$ serving to scan the space within adjacent clusters. In an optimal scenario illustrated in FIG. 1B, the initial access time can be reduced to ⅓ of its original value when the UE 100 is located in the centre of the cluster. This is because it is expected that a beam pair will be established between the UE 100 and mmSC $S_1$ and so only reception beams extending towards the cluster need to be examined. However, this optimal scenario cannot be relied upon. If the UE is located at the bottom edge of the cluster, or close to mmSC $S_2$ or $S_3$, it may not be possible for the UE to access the mmSC $S_1$ because of propagation losses. Therefore, with a cluster consisting of $N_{bs}$ mmSCs 102, the initial access time reduction of $1/N_{bs}$ represents the maximum possible time reduction, and is unlikely to be achievable for the majority of implementations.

The present disclosure effectively builds on the clustered mmSCs scenario depicted in FIG. 1B and provides for a higher level of coordination between the mmSCs. In addition to the mmSCs in a cluster exchanging location and beam scan information, in accordance with certain embodiments of the present disclosure the mmSCs exchange measurement reports with each other via the backhaul links. Based on the measurement reports, the location of the UE can be estimated allowing for one or more of the cluster of mmSCs to select an appropriate reception beam directed towards the estimated UE location before the next UE transmission beam sweep. By jointly coordinating the initial access procedure in this way, the initial access time can be effectively reduced. This estimation of the UE location based only on the RA preamble received by a cluster of mmSCs represents a clear departure from conventional approaches to initial access in a standalone mmSC network in which knowledge of the UE location can only be gained once the connection is complete.

Figure 2:
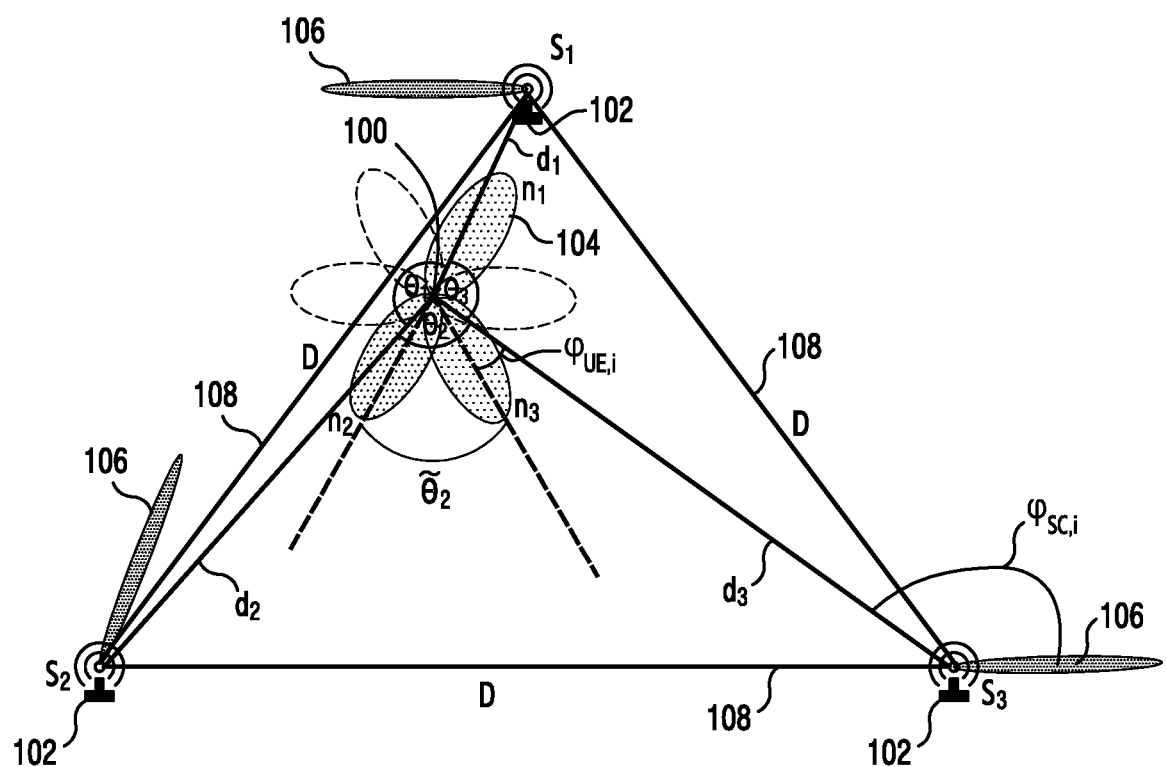
FIG. 2 illustrates a system model in accordance with an embodiment of the present disclosure.

Referring to FIG. 2, this illustrates a system model in accordance with an embodiment of the present disclosure. The system model assumes that there are three mmSCs 102 ($S_1$, $S_2$, $S_3$) in a cluster forming an equilateral triangle with side length D for simplicity. The extension to other triangles and clusters having more than three mmSCs will be readily appreciated by the skilled person, and the case of more than three mmSCs is described below. The UE 100 is assumed to be located in the triangle. Again, the extension to the case where the UE is located out of the triangle is straightforward.

FIG. 2 illustrates the situation during a first UE sweep in which the UE transmits the RA preamble through each UE beam in turn and each mmSC is operating a randomly assigned reception beam. FIG. 2 illustrates the likely scenario in which none of the randomly assigned mmSC reception beams are directed towards the UE.

The distances between the UE and the mm-wave SCs are assumed to be $d_1$, $d_2$ and $d_3$ and angles in between are assumed to be $\theta_1$, $\theta_2$, and $\theta_3$.

As described above, the beam directions of the mmSC 102 and the UE 100 need to be aligned to tackle the propagation losses experienced with mm-wave communication. Only if the Power Density Profile (PDP) value (also referred to herein as the received signal strength or received power level) of the preamble received from the UE exceeds $\gamma_{ra}$ is the RA preamble considered correctly received by the mmSC 102 such that a RA response message can be transmitted to the UE 100. For a given beam direction of an mmSC, which can or can not point to the UE, if the UE conducts a full transmission beam sweep (that is, the UE transmits a preamble in each beam direction), a measurement report can be generated, where for each UE beam index a PDP value is calculated.

We can compute the PDP of the signal received by the $i^{th}$ mmSC for any UE transmission beam as follows:

$$P_{sc}=P_{UE}+G_{UE}(\varphi_{UE,i})+G_{sc}(\varphi_{sc,i})-L(d_i) \quad (1)$$

where $P_{UE}$ is the transmit power of the UE, $G_{UE}$ and $G_{sc}$ are the UE and mmSC antenna gains respectively, $\varphi_{UE,i}$ is the angle between the main UE antenna lobe and the $i^{th}$ mmSC (identified in FIG. 2 in respect of an exemplary UE beam and $S_3$), $\varphi_{sc,i}$ is the angle between the main antenna lobe of the $i^{th}$ mmSC and the UE (identified in FIG. 2 in respect of an exemplary UE beam and $S_3$), L is the path loss component and $d_i$ is the distance between the $i^{th}$ mmSC and the UE.

A simplified directional antenna model is assumed for both the mmSC and the UE, as follows:

$$G(\varphi) = \begin{cases} G_0 - 3.01 \times \left(\frac{2\varphi}{\varphi_{-3dB}}\right)^2, & 0 \le \varphi \le \varphi_{ml}/2 \\ G_{sl}, & \varphi_{ml}/2 \le \varphi \le \pi \end{cases} \quad (2)$$

where:

$$\varphi_{ml} = 2.6\varphi_{-3dB}, \quad (3)$$

$$G_0 = 10\log\left(\frac{1.6162}{\sin(\varphi_{-3dB}/2)}\right)^2,$$

$$G_{sl} = -0.4111\ln(\varphi_{-3dB}) - 10.579.$$

Here $\varphi$ is an arbitrary angle within the range $[0, \pi]$, $\varphi_{-3dB}$ is the angle of half-power beam width, $\varphi_{ml}$ is the mail lobe width in units of degrees, and $G_0$ and $G_{sl}$ are the maximum antenna gain and the side lobe gain, respectively.

The path loss model can be calculated as follows:

$$L(d) = 61.39 + 24.7\log(d) \quad (4)$$

where d is the distance in meters.

The process of performing a PDP measurement will now be described. In LTE, the initial access is initiated by UE broadcasting a preamble sequence built by cyclically-shifting a Zadoff-Chu (ZC) sequence of prime length $N_{zc}$, as follows:

$$x_u(n) = \exp\left[-j\frac{\pi u n(n+1)}{N_{ZC}}\right], \quad 0 \le n \le N_{ZC} - 1 \quad (5)$$

where u is the index of the sequence. The preamble sequence will be transmitted using SC-FDMA and the detailed initial access and detection procedures can be found in 3GPP Technical Specification TS 36.300 V13.1.0 Overall Description, September 2015. In accordance with the present disclosure the same ZC sequences and initial access procedure can be employed and the PDP of the received sequence is as follows:

$$PDP(l) = |z_u(l)|^2 = \left|\sum_{n=0}^{N_{ZC}-1} y(n) x_u^*(n+l)\right|^2 \quad (6)$$

where y(n) is the received preamble sequence and $z_u(1)$ is the discrete periodic correlation function at lag 1. Once a PDP peaks is found above a detection threshold $\gamma_{ra}$, it can be assumed that a UE is discovered by an mmSC. The threshold $\gamma_{ra}$ is determined by the false detection probability. A false detection occurs when the PDP peak is above threshold $\gamma_{ra}$ but there is actually no preamble signal transmitted. In such a situation, the PDP peaks are solely caused by the Gaussian noise. The threshold $\gamma_{ra}$ can be calculated based on the Gaussian distributed noise as depicted in the above reference 3GPP TS 36.300 V13.1.0.

It will be appreciated that for the initial access procedure there is the possibility of collision and failure. If multiple UEs attempt initial access at the same time a collision can occur, as for the current random access procedure in LTE. A collision will result in access failure and each postpones attempting initial access again by a random time to ensure only one UE accessing at one random access occurrence.

Figure 3:
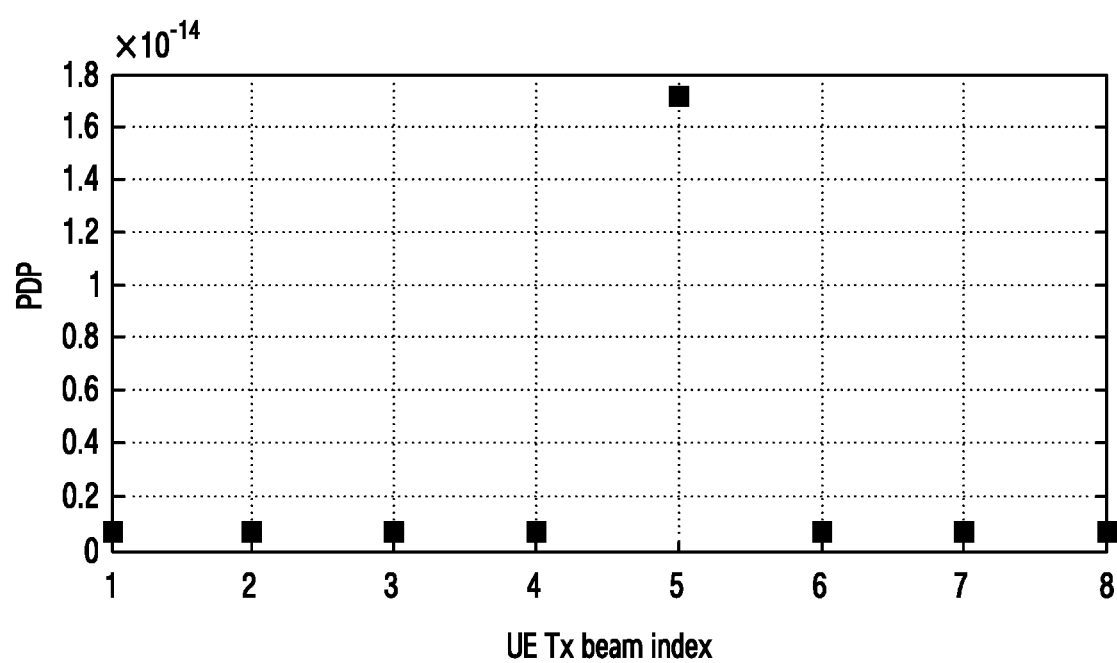
FIG. 3 illustrates PDP measurement results for a single mmSC according to the system model of FIG. 2 in response to a UE transmission full sweep.

For a given beam direction of a mmSC 102 in the cluster of FIG. 2, which can or may not point to the UE 100, if the UE conducts full transmission beam sweep, a measurement report can be generated, where for each UE beam index a PDP peak is obtained. More generally, each mmSC (base station) can measure the received signal from the UE in respect of a plurality of UE beam indices, which may not always correspond to a full scan. Such a measurement report for a single mmSC is illustrated in FIG. 3. As can be seen, the PDP peak of UE beam index 5 is significantly larger than the others, which is presumed to be because the direction of this UE transmission beam points most closely towards the mmSC producing the measurement report. In accordance with the present disclosure, this measurement report can be shared with each member of the mmSC cluster. For a cluster with at least 3 mmSCs, the UE's location can be coarsely estimated based on the measurement reports as will be described below. The mmSCs are therefore able to reorder the mmSC reception beams and move the best beams in the forepart when sweeping such that they are used first to examine the UE initial access transmissions.

As noted above, according to certain embodiments of the present disclosure, the mmSCs are divided into clusters, for instance with three mmSCs. When a UE conducts a full sweep, each mmSC generates one measurement report. The measurement reports are exchanged via the backhaul links and the position of the UE is then estimated by the mmSCs. Based on the estimation, the mmSC reception beams are reordered. It will be appreciated that in other embodiments the mmSC reception beams can be reordered on the basis of the measurements without explicitly outputting the estimated UE location. Given correct alignment of adjusted mmSC reception beam as a result of the estimated UE position, it is probable that following a subsequent UE full sweep an uplink connection can be established within one of the cluster of mmSCs. This uplink connection could either associate the UE to the same mmSC in downlink or a different mmSCs (asymmetric uplink and downlink). Furthermore, multiple uplink connections can subsequently be established using the existing uplink connection.

Instead of examining all of the mmSC beams starting from the best one (selected on the basis of the estimated UE position), instead only a subset of all mmSC beams can be used, for instance the best beam assumed to point at the UE and its adjacent beams. Only this subset can be examined. The motivation of this embodiment is to reduce the number of mmSC reception beams to be examined. The rational of this embodiment is based on the fact that the estimation of the UE's location is an approximation. There is a probability that the best mmSC reception beam chosen does not actually point towards the UE (for instance, due to non-line of sight links as described below and also due to the limited choice of mmSC reception beams available, assuming the use of a codebook). In such a case, adjacent beams can in fact point towards the UE. Therefore, by choosing not only the best beam but also the adjacent beams to form a mmSC searching subset, the likelihood of successful initial access is enhanced. Furthermore, while the system model of FIG. 2 shows a cluster consisting of three mmSCs 102, there can be more than three mmSCs in the cluster. When the UE conducts a full sweep, each mmSC generates a measurement report. All reports are exchanged via the backhaul links and a subset of three or more reports can be chosen based on certain criterion to estimate the position of the UE. The criterion could be based on the measurement reports including the highest PDP peak those correspond to mmSCs most likely to be accessed successfully. Alternatively, account can be taken of existing load on each mmSC such that even if a mmSC identified the highest PDP peak it is not chosen if many UEs are already associated with that mmSC. Based on the UE location estimation, the mmSC reception beams can be reordered or a subset of reception beams selected as noted above for a mmSC reception beam sweep.

In the above embodiments, it is assumed that there is a predefined beam codebook at the SCs. In one embodiment of the present disclosure, the mmSCs may not use a beamforming codebook. Based on the UE location estimate, the mmSCs can tune their beam direction towards the UE and adjust the width of the reception beams in order to further accelerate the initial access procedure.

Embodiments of the present disclosure can be divided into four phases: PDP measurement (as described above), coordinated beam sweep reordering (as a result of the UE location estimate), initial access, and asymmetric multi-cell association. In the first phase the involved mmSCs measure the PDP of the received preamble and share the measurement reports via the backhaul links. In the second, beam sweep reordering phase, mmSCs jointly estimate the best reception beam for each mmSC based on the measurement reports and reorder the mmSC reception beams to test the best reception beams first (alternatively, the estimation can be performed at a single point upon receipt of the measurement reports, and the appropriate mmSC reception beam disseminated to each mmSC). In the third phase, the UE conducts one or more full transmission beam sweeps during which the set of selected mmSC beams is used until an uplink connection is established successfully. In the last phase, the existing uplink connection can be used to establish multiple uplink connections which may or may not associate the UE to the same mmSC in the downlink.

Figure 4:
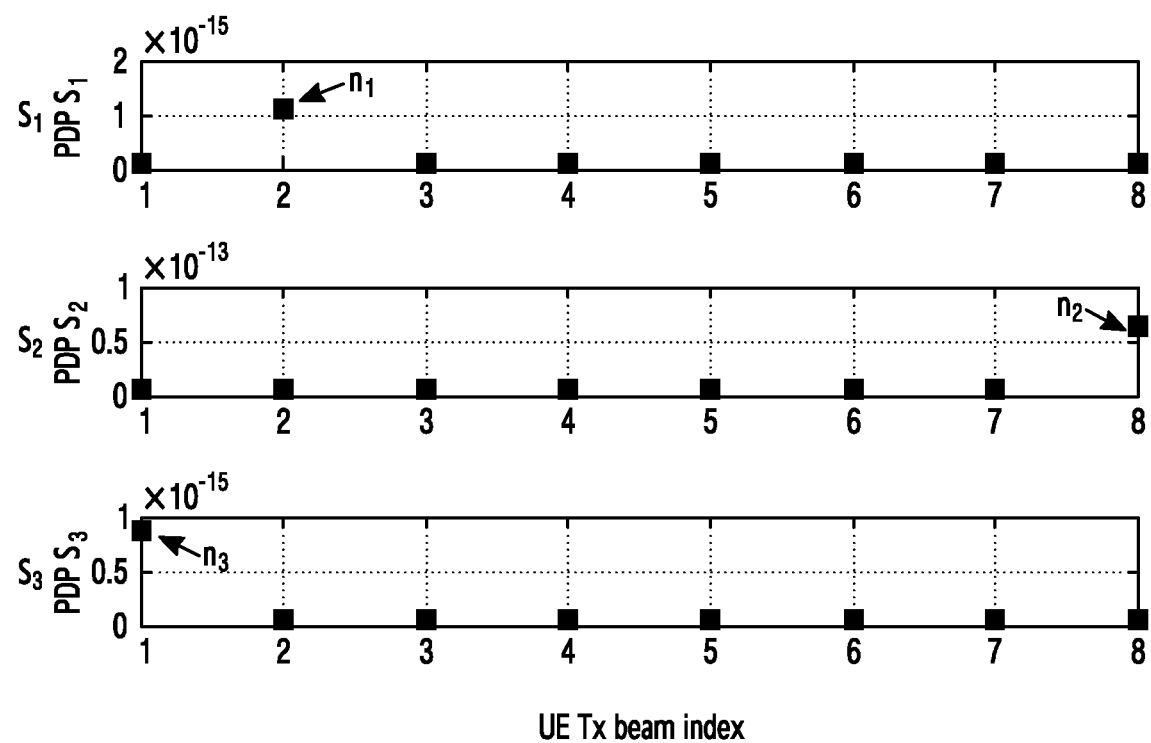
FIG. 4 illustrates PDP measurement results for a cluster of three mmSCs according to the system model of FIG. 2 in response to a UE transmission full sweep in accordance with an embodiment of the present disclosure.

As the mmSCs are connected via the backhaul links, they can be synchronized to start a reception beam sweep at the same time. The reception beam directions are randomly chosen at the beginning The UE conducts full beam sweep and transmits the preamble for each transmission beam index every $T_{ra}$ seconds. Each mmSC also calculates PDP values every $T_{ra}$ seconds and after $N_{tx}T_{ra}$ seconds one UE full sweep is completed and a measurement report is generated. Within each measurement report, there are $N_{tx}$ PDP values, each corresponding to one UE transmission beam. Referring to FIG. 4, this illustrates a set of three measurement reports exchanged via the backhaul links as shown in FIG. 2 for the illustrated cluster of three mmSCs ($S_1$, $S_2$, $S_3$). Three peak values of the measurement reports identify three peak UE transmission beam index $n_1$, $n_2$ and $n_3$ whose directions point at corresponding mmSCs (also labelled in FIG. 2).

The second phase in which the location of the UE is estimated will now be described in greater detail. It will be appreciated that in a distributed approach this location estimation can be performed independently at each mmSC. Alternatively, it can be performed centrally at a single mmSC or another network component, and the estimate disseminated. In some embodiments the measurement results may not be sent to each and every other mmSC in the cluster. It can be readily seen from the system model of FIG. 2 and the PDP measurement reports of FIG. 4 that $\theta_i$ (the angle from the UE to a pair of mmSCs in the cluster) can be estimated based on the peak UE transmission beam index as follows:

$$\tilde{\theta}_i = \begin{cases} \dfrac{2\pi(n_{i+1} - n_i)}{N_{tx}}, & \text{if } n_{i+1} > n_i \\ \dfrac{2\pi(N_{tx} - n_i + n_{i+1})}{N_{tx}}, & \text{if } n_{i+1} < n_i \end{cases} \quad (7)$$

Equation (7) is based on the assumption that there is a pre-defined codebook for UE transmission beams which is known in advance by the mmSCs. If the UE is adaptively steering the beam, this action must have been agreed with the mmSCs beforehand. For example, this can be done by following ways: the adaptive steering is pre-defined and agreed; or the adaptive steering is supervised by the mmSC via downlink broadcasting channel (PBCH). It will be appreciated that adaptive steering causes a larger signaling overhead. Fully adaptive beam sweep for the UE can be difficult and time consuming in practice.

It will be appreciated that equation (7) yields only an estimate of the angle from the UE to a pair of mmSCs in the cluster because the direction of the UE transmission beam is not always perfectly aligned with the direction of the mmSCs as shown in FIG. 2. The estimates angle ($\tilde{\theta}_i$) corresponds to the angle between the pair of UE transmission beams that are most closely aligned to the pair of mmSCs, and as such resulted in the pair PDP peaks. The example of $\tilde{\theta}_2$ is labelled in FIG. 2.

The distances between the UE and each mmSC in the cluster can be determined by solving the following equations:

$$\begin{cases} d_1^2 + d_2^2 - 2d_1d_2\cos(\tilde{\theta}_1) = D^2 \\ d_2^2 + d_3^2 - 2d_2d_3\cos(\tilde{\theta}_2) = D^2 \\ d_1^2 + d_3^2 - 2d_1d_3\cos(\tilde{\theta}_3) = D^2 \end{cases} \quad (8)$$

Figure 5:
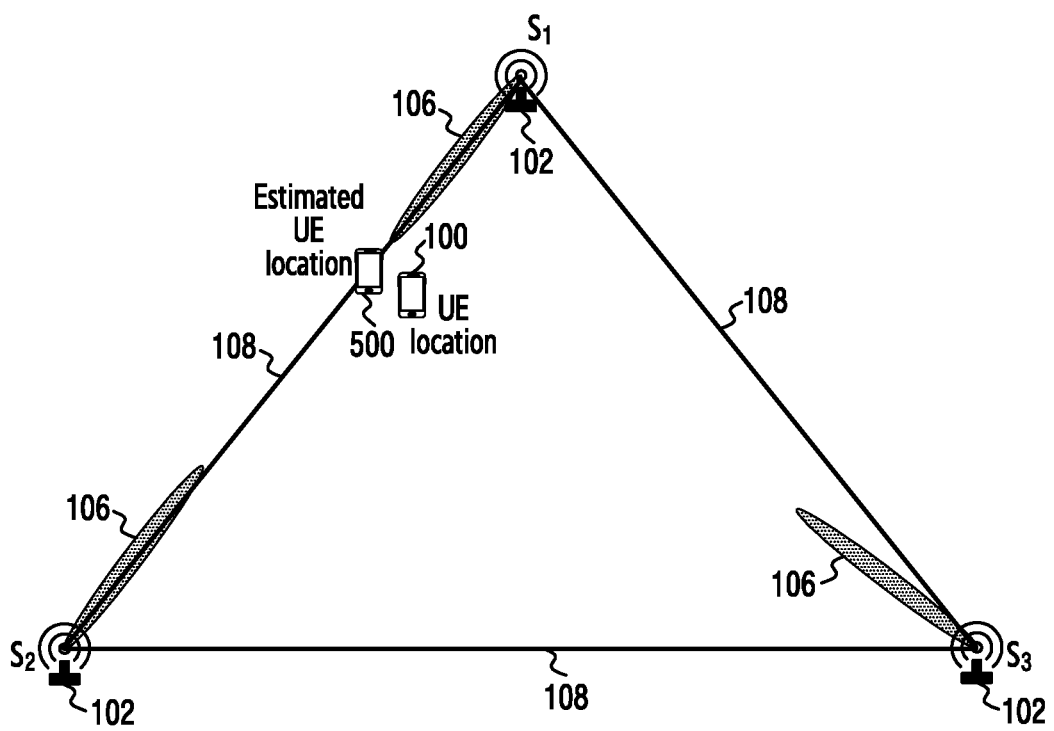
FIG. 5 illustrates mmSC reception beam reordering according to an estimated UE location determined through the system model of FIG. 2.

When estimates for $d_1$, $d_2$ and $d_3$ are established, the estimated location of the UE can be determined. The mmSCs can therefore reorder the reception beam set and choose the reception beams pointing at the estimated UE location in the next round of the UE transmission beam sweep as shown in FIG. 5. In FIG. 5 it can be seen that the reception beam 106 for each mmSC 102 is generally pointing towards the estimated UE location 500 (within the constraints of a limited selection of reception beams within a mmSC codebook, if appropriate). FIG. 5 also illustrates that there is an offset between the true location of the UE 100 and the estimated UE location 500. There is a high probability that at least one or two mmSC reception beams do in fact point in the correct direction for the true UE location, so long as the error in the estimated UE location 500 is relatively small. Therefore, in the following UE transmission beam sweep, there is a high chance of pairing at least one mmSC reception beam and a UE transmission beam.

As noted above, in accordance with certain embodiments of the present disclosure, the cluster size can be larger than 3. In accordance with certain embodiments of the present disclosure, for a larger cluster size the three measurements with the largest PDP peaks can be selected (or some other criterion applied), and the rest of the estimation procedure keeps the same. Alternatively, more than three of the measurement reports can be used to further enhance the UE location estimation accuracy.

Considering the sharp drop of the antenna gain when the angle $\varphi$ is larger than the main lobe width $\varphi_{ml}$, we can assume that PDP peaks can be obtained as long as as $\varphi \leq \varphi_{ml}$. In contrast to the above described technique in which the central axis of each UE transmission beam is use to estimate $\theta_i$, to produce a single value estimation for $\theta_i$, a range of possible values for $\theta_i$, can be considered as follows:

$$\hat{\theta}_i - \varphi_{ml} \leq \theta_i \leq \hat{\theta}_i + \varphi_{ml} \qquad (9)$$

Figure 6A:
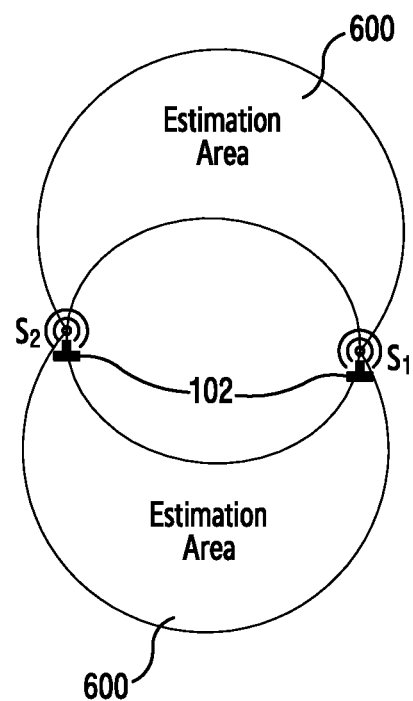
FIGS. 6A and 6B illustrate the determination of estimation areas for the location of a UE.
Figure 6B:
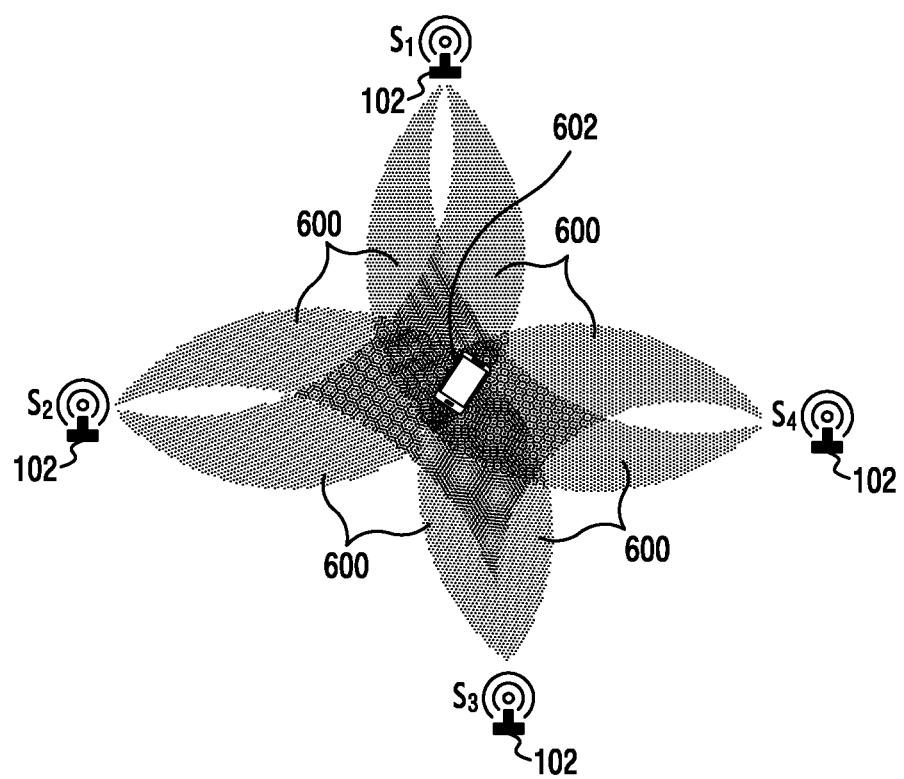

The increase in accuracy of the US location estimate in the event that a larger number of mmSCs in the cluster provide measurement reports can be appreciated as follows in connection with FIGS. 6A and 6B. If the angle from one point to two fixed points is constant, the locus of that point defines a circular arc that pass through two fixed points. Therefore the following equations identify an area, denoted as the estimation area 600 as shown in FIG. 6A:

$$d_1^2 + d_2^2 - 2d_1 d_2 \cos(\theta_1) = D^2$$

$$\hat{\theta}_i - \theta_{ml} \leq \theta_i \leq \hat{\theta}_i + \theta_{ml} \qquad (10)$$

The UE location falls within the estimation area 600. By extension to a situation where there are plural mmSCs, for instance four as shown in FIG. 6B, the UE location can be determined to be in the overlapping area of the estimation areas identified by the corresponding equations in (10). With each additional mmSC, an additional set of equations (10) is added and thus a further estimation area generated. The overlapping of all estimation areas 600 thus provides a smaller region 602 in which it is expected that the UE is located.

Figure 7:
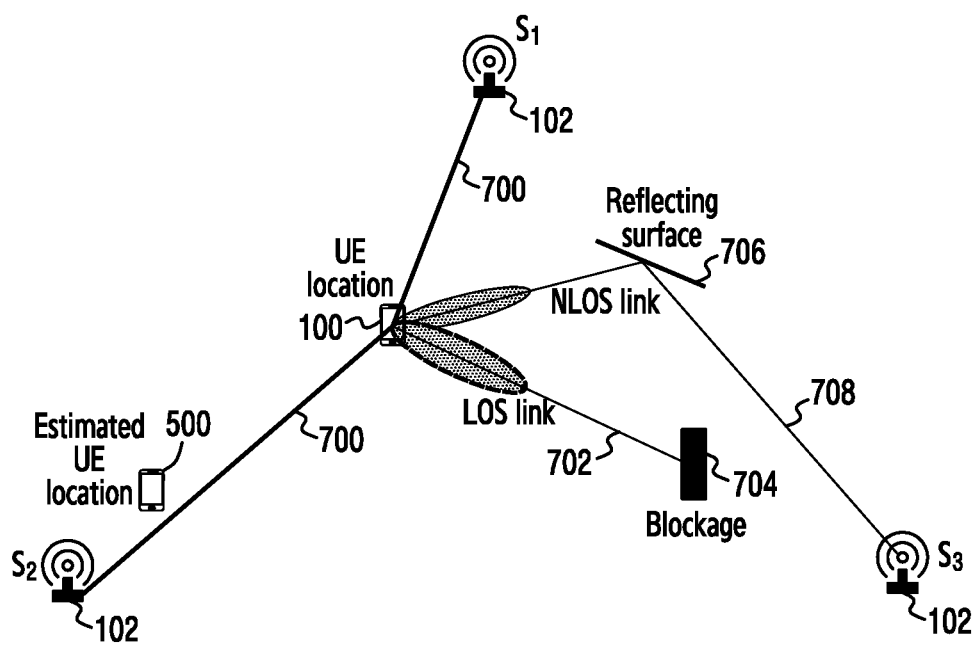
FIG. 7 illustrates the effect of non-line of sight transmission paths.

The embodiments of the disclosure described above for estimating the location of the UE apply to a scenario in which there are Line Of Sight (LOS) links between the mmSCs and the UE. However, it will be appreciated that a LOS link between the UE and a mmSC can be blocked. FIG. 7 illustrates a situation in which for a cluster of three mmSCs, LOS links 700 are maintained to $S_1$ and $S_2$ but a LOS link 702 to mmSC $S_3$ through UE transmission beam 1041 is blocked by a blockage 704 such as a wall or a person. However, another UE beam 1042 is directed towards a reflector 706, which can reflect the UE preamble towards mmSC $S_3$ resulting in a Non-Line Of Sight (NLOS) link 708 being created. If this NLOS link is undetected then it will be appreciated that the estimated UE location might be entirely different from the actual UE location. The result is likely to be that none of the three mmSCs 102 can appropriately adjust their reception beams toward the UE 100. This can either cause the initial access procedure to be delayed or for it to fail.

The negative effects of NLOS links can be efficiently avoided if a cluster of mmSCs consists of more than three mmSCs. This is because the PDP measurement for a NLOS link is likely to be significantly lower than that for a LOS link. A larger cluster has redundancy in the sense PDP measurements from one or more mmSC can be avoided. If a subset of the strongest PDP measurements is selected then it is likely that the selected PDP measurement peaks will correspond to LOS links. For an assumed reflection coefficient of 0.7, such that the NLOS link is at least 1.5 dB worse than the LOS link, an Monte-Carlo simulation can be conducted with the following system settings:

There are N mmSCs in one cluster;

The blocking probability of each mmSC is $P_{blk}$ (the probability that there is no LOS link to the mmSC from the UE);

The three mmSCs with the largest PDP peak are chosen to estimate the UE location.

Figure 8:
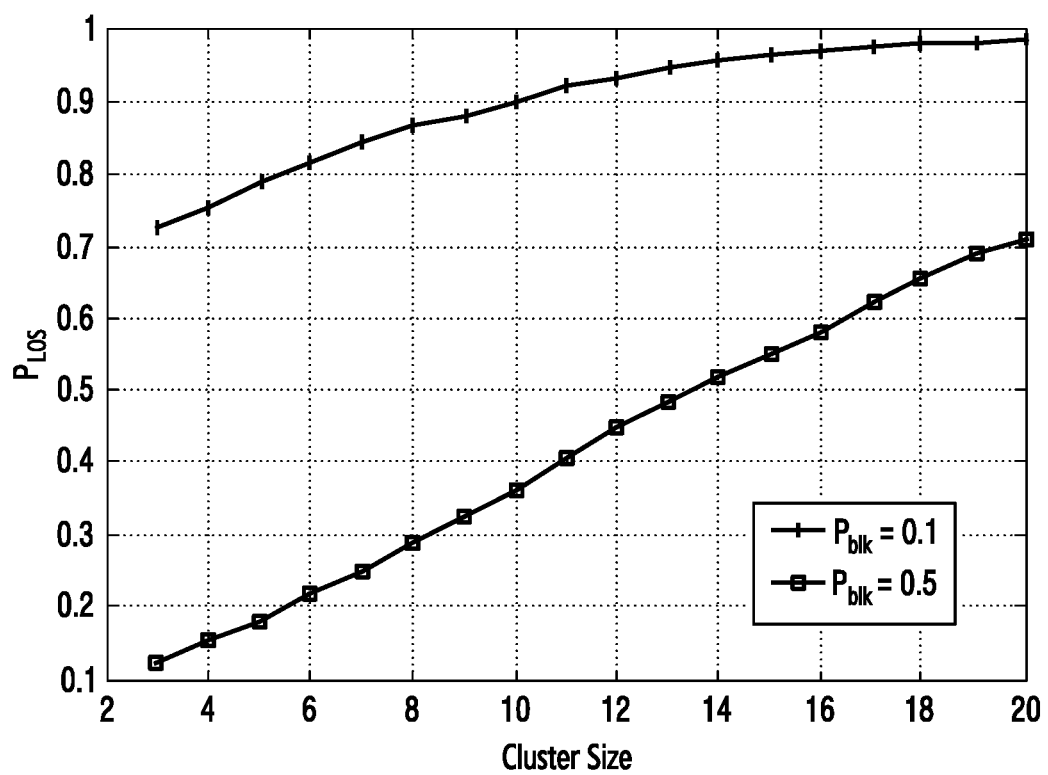
FIG. 8 is a graph illustrating the effect of cluster size on the probability of line of sight paths being selected.

The probability $P_{LOS}$ that the three chosen mmSCs are not blocked (that is, they have LOS links to the UE) is depicted in FIG. 8 as a function of the cluster size (N). The simulated results for $P_{LOS}$ are shown for two different values of $P_{blk}$. As can be seen, for a small block probability $P_{blk}=0.1$, at least three LOS links exist and will be selected for more than 90% of the time when the cluster size is larger than 10. Even with a large block probability $P_{blk}=0.5$, PLOS can be above 0.7 with the cluster size larger than 20. In a highly dense deployment scenario, cluster size could be even larger than 20 and thus there is a high probability that LOS links will exist and be selected for estimating the UE location. In addition, NLOS links can be identified and eliminated through knowledge of the positions of the mmSCs, further increasing $P_{LOS}$.

Figure 9A:
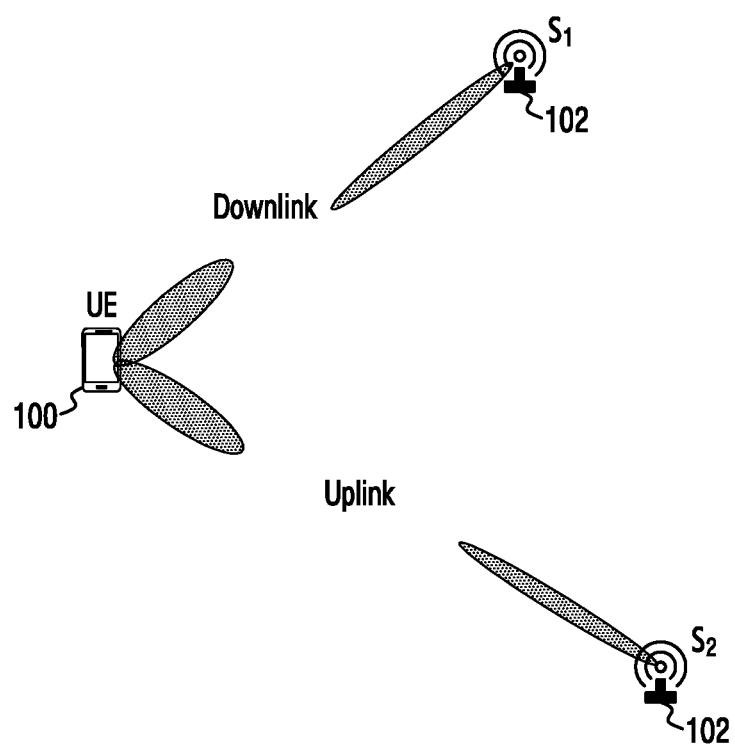
FIGS. 9A and 9B illustrate two options for asymmetric uplink and downlink connections, FIG. 9B further illustrating multiple connections.
Figure 9B:
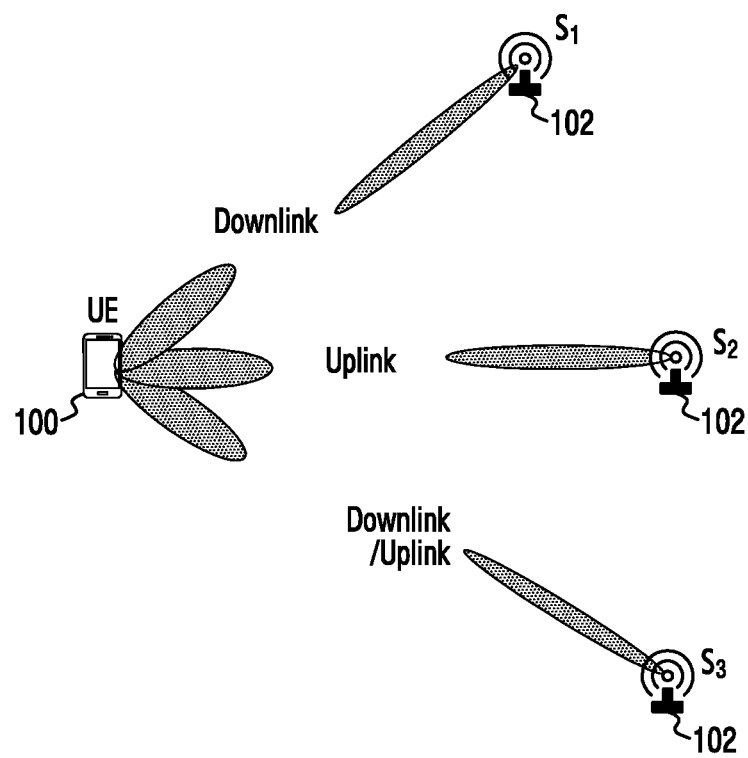

As noted above, it is assumed that the UE has been synchronized in the downlink before it can initiate RA procedure. The present disclosure does not guarantee or require that the UE is connected to the same mmSC in the downlink and the uplink. FIG. 9A shows a UE 100 being connected to separate mmSCs 102 for downlink and uplink. In the downlink, the UE is associated with mmSC $S_1$ and in the uplink the UE is associated with mmSC $S_2$. Uplink and downlink decoupling can be beneficial, for instance in the case of asymmetric downlink/uplink traffic. In addition, since the mmSCs within one cluster are connected via backhaul links, multiple connections can be established to the same UE using the existing connection as shown in FIG. 9B. Here the UE can be further associated with multiple mm-wave SCs. Multiple connections advantageously reduce the possibility of degraded performance or loss of connection due to blockage.

Modelling is now presented using a model of the disclosure generated within MATLAB® (available from MathWorks® of Natick, Mass., USA, at www.mathworks.com).

Figure 10A:
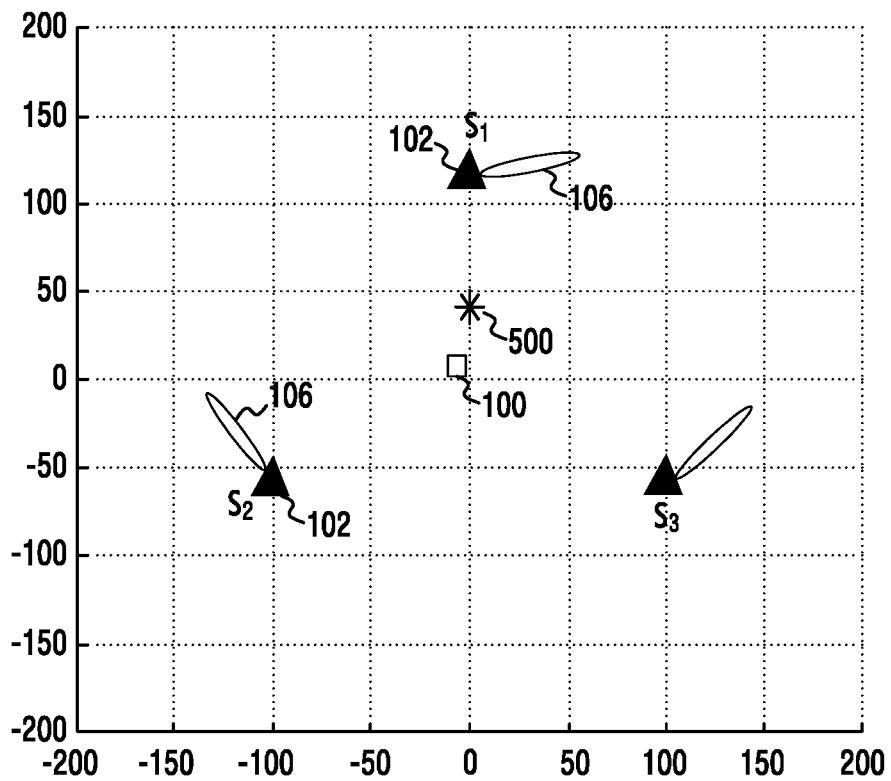
FIGS. 10A and 10B illustrate a simulation of UE location estimation according to certain embodiments of the present disclosure.
Figure 10B:
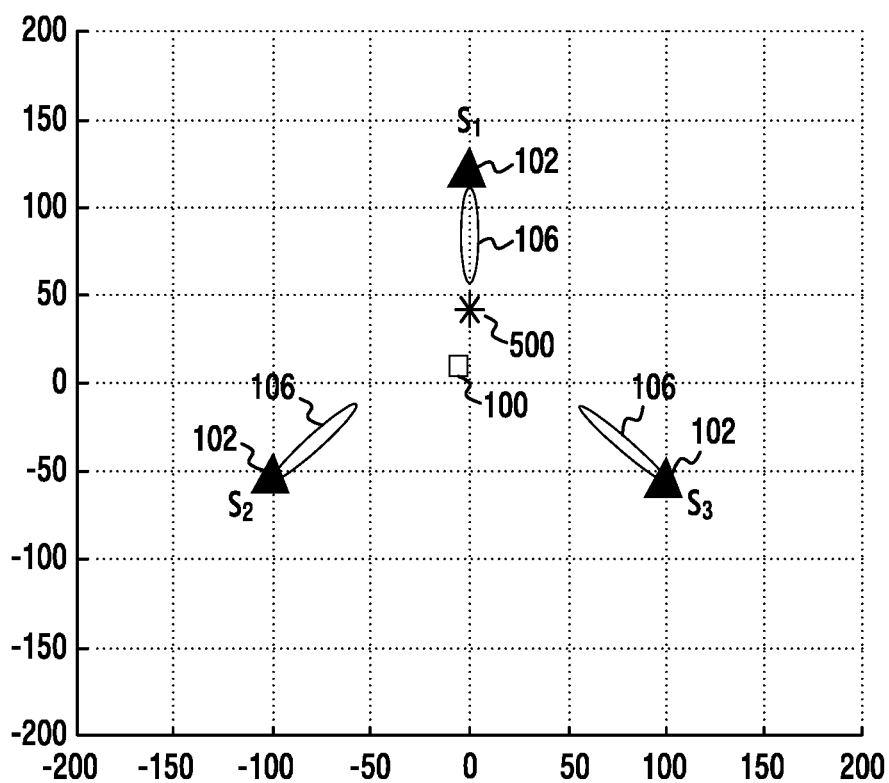

In the model a cluster of three mmSCs have an inter-mmSC distance (D) of 200 m, a bandwidth of 1.08 MHz, a noise limit of NO of $-171$ dBm/Hz, a ZC sequence length of 839 and Nrx reception beams. The carrier frequency is assumed to be 28 GHz. FIG. 10A shows the estimated UE location 500 using the proposed disclosure and the true location of the UE 100. The mmSCs beam directions 106 are chosen randomly. As described above, after one UE transmission sweep round, an estimate for the UE location 500 is generated and the estimated location 500 is quite close to the actual location 100. In the next UE transmission beam sweep round, as shown in FIG. 10B, the reception beams for the mmSCs 102 are directed generally towards the estimated UE location. Owing to the closeness of the UE location estimate 500 to its true location 100, the reception beam for $S_1$ in fact also points at the UE 100. In FIGS. 10A and 10B each axis expresses distance in meters.

Figure 11A:
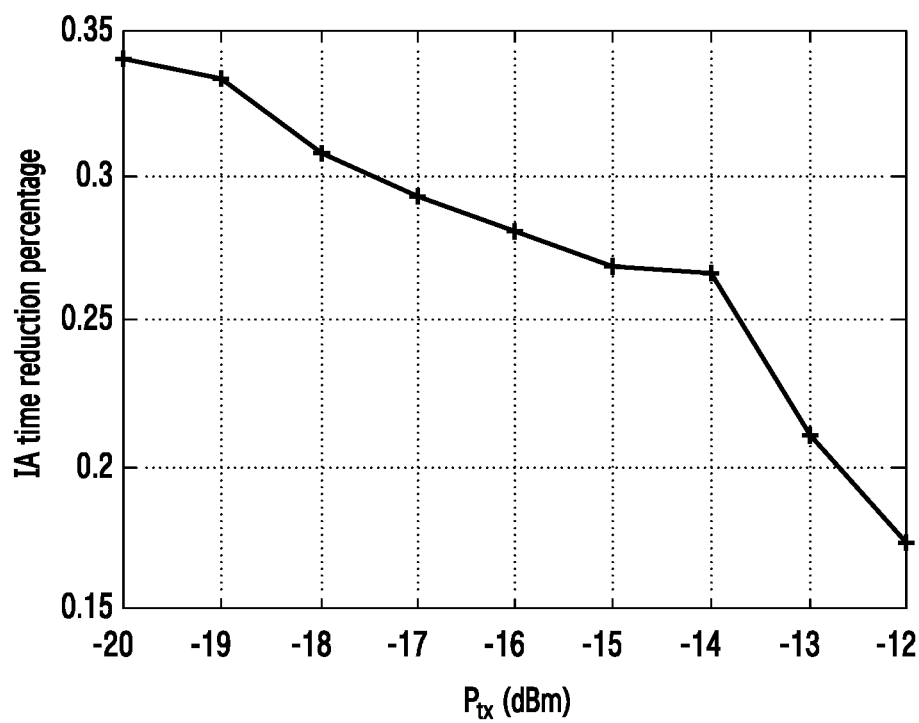
FIGS. 11A and 11B illustrate simulations of initial access time reduction according to certain embodiments of the present disclosure.
Figure 11B:
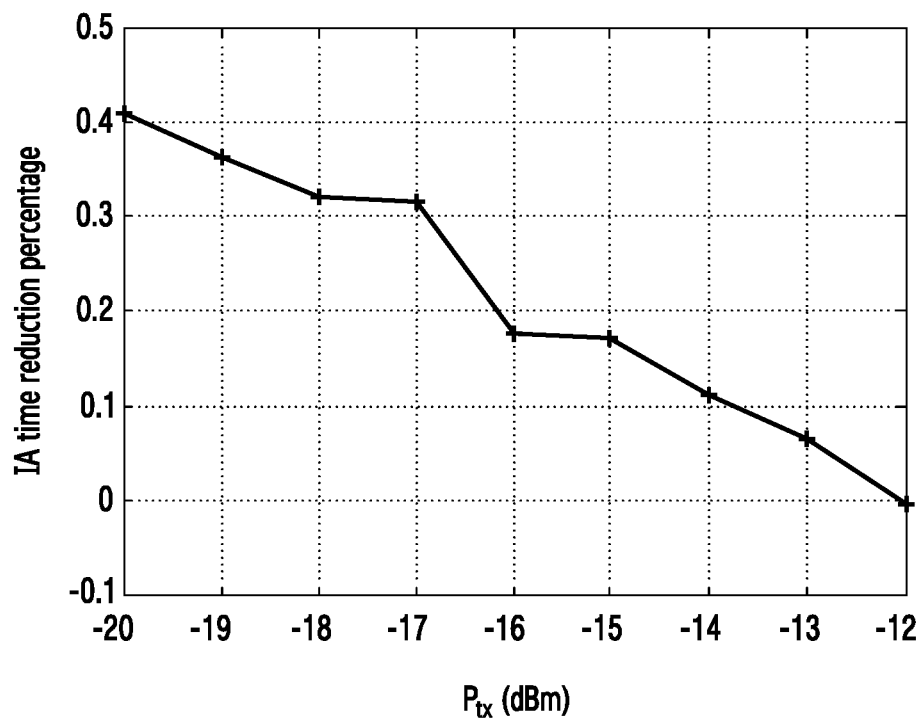

FIGS. 11A and 11B shows the percentage initial access time reduction achieved using the present disclosure expressed as a fraction of the initial access time conducted using a conventional exhaustive search). FIGS. 11A and 11B show the proportional time reduction for a UE having $N_{tx}$ transmission beams: $N_{tx}=4$ and $N_{tx}=8$ respectively expressed as a function of UE transmission power. The proportional time reduction is calculated as follows:

$$P_{er} = \frac{T_{ra\_new} - T_{ra\_con}}{T_{ra\_con}} \qquad (11)$$

$T_{ra\_new}$ and $T_{ra\_con}$ are the initial access time according to an embodiment of the present disclosure and according to the conventional approach respectively. As can be seen, the reduction of initial access time decreases with increased UE transmission power, which is reasonable since with very high UE transmission power the PDP of a received UE preamble can be so strong that it exceeds the threshold even without transmission and reception beam paring. It can also be seen that the initial access time is significantly reduced as a result of the present disclosure, especially towards the lower end of the transmission power of the UE.

Figure 12A:
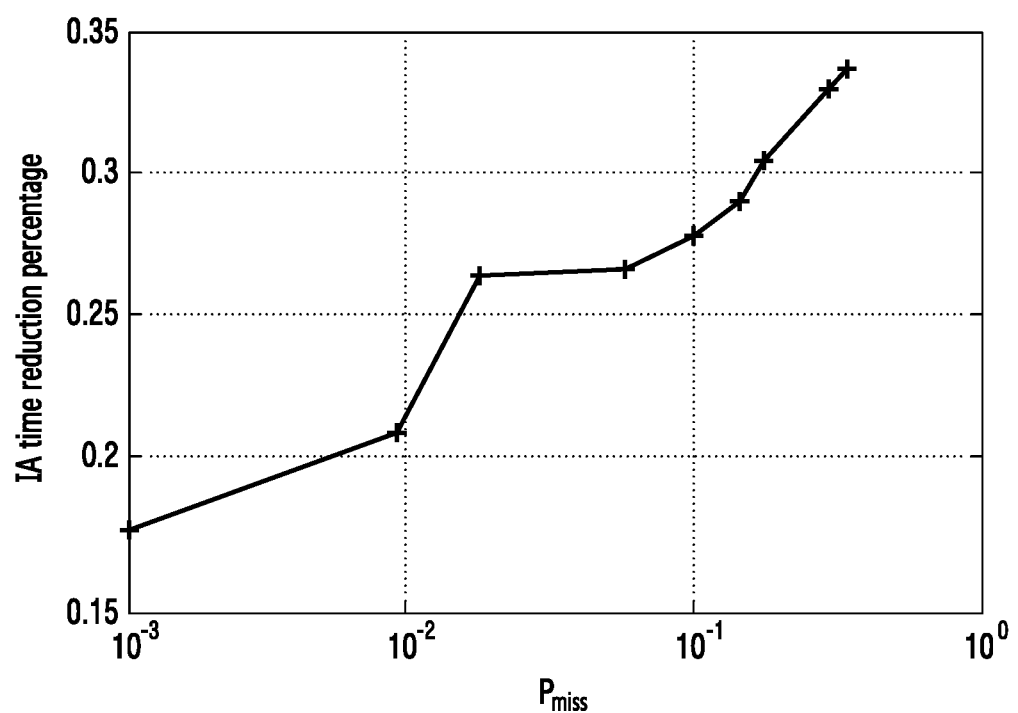
FIGS. 12A and 12B illustrate simulations of percentage initial access time reduction according to certain embodiments of the present disclosure.
Figure 12B:
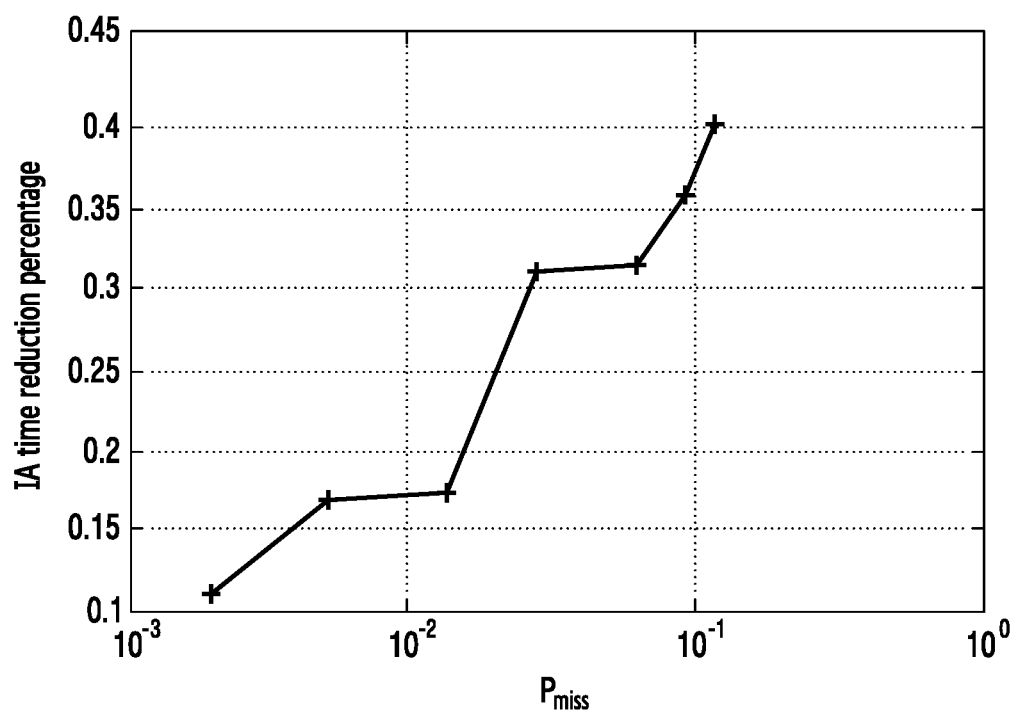

FIGS. 12A and 12B shows the percentage initial access time reduction expressed as a fraction against the miss detection probability $P_{miss}$ for $N_{tx}$=4 and 8 respectively. With a larger target $P_{miss}$, initial access time can be further reduced. With a 1% $P_{miss}$ target, which is normally used in LTE/LTE-A, initial access time can be reduced by 22% and 18% for $N_{tx}$=4 and 8 respectively, according to an embodiment of the present disclosure.

Figure 13:
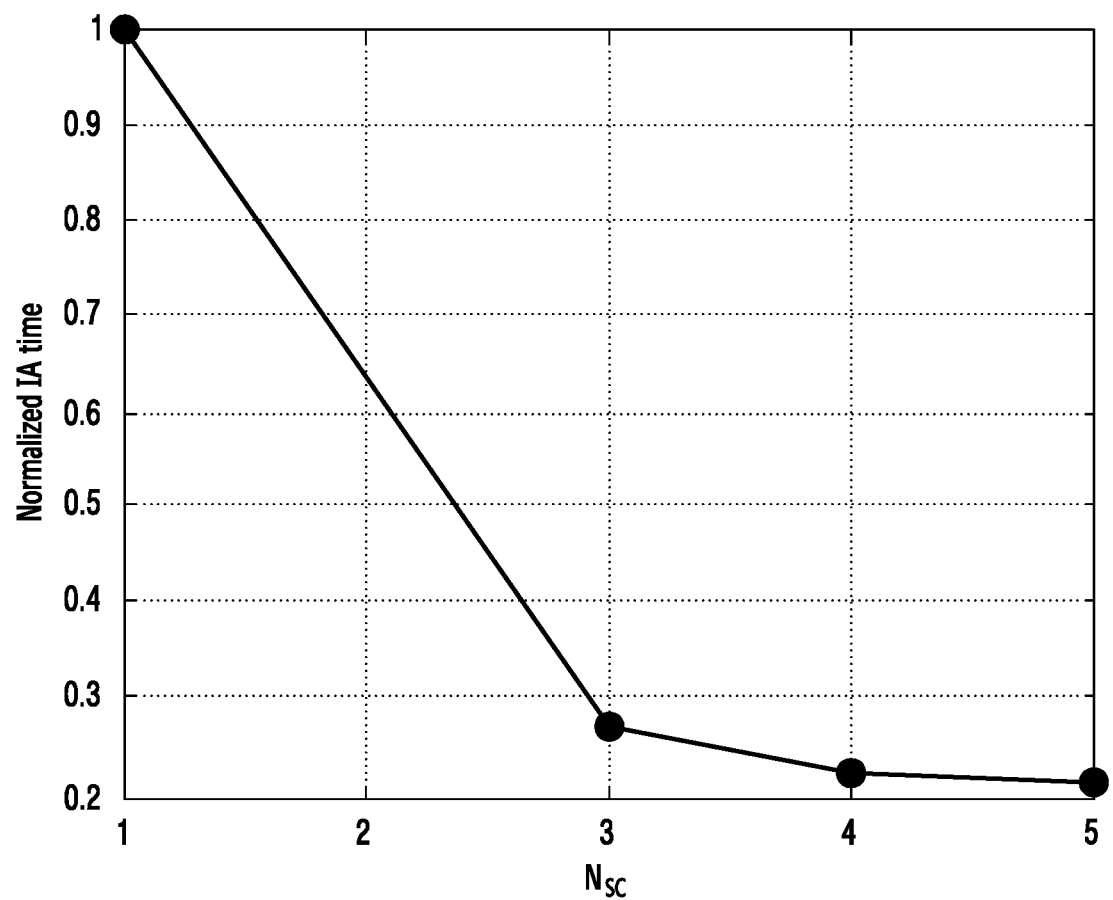
FIG. 13 illustrates a simulation of initial access time when the size of a cluster changes according to certain embodiments of the present disclosure.

FIG. 13 shows the normalized initial access time when the size of the cluster ($N_{sc}$) changes. For $N_{sc} \geq 3$, conventional exhausting searching is employed. For $N_{sc} \geq 3$, the proposed disclosure is employed and additional mmSCs are utilized to further fine tune the approximation. It can be seen that there is a significant reduction once the proposed disclosure is employed when $N_{sc}$=3. Moreover, using additional SCs can further reduce the initial access time.

Figure 14:
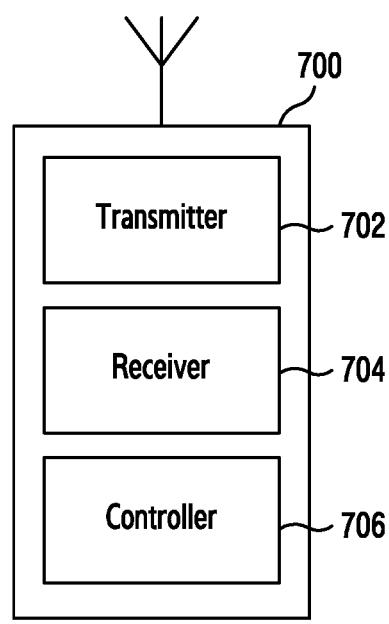
FIG. 14 illustrates the structure of a 5G base station in accordance with an embodiment of the present disclosure.

FIG. 14 provides a schematic diagram of the structure of a mmSC 700 which is arranged to operate in accordance with the examples of the present disclosure described above. The mmSC includes a transmitter 702 arranged to transmit signals to a UE; a receiver 704 arranged to receive signals from the UEs; and a controller 706 arranged to control the transmitter and receiver and to perform processing such as in accordance with the above described initial access method.

Figure 15:
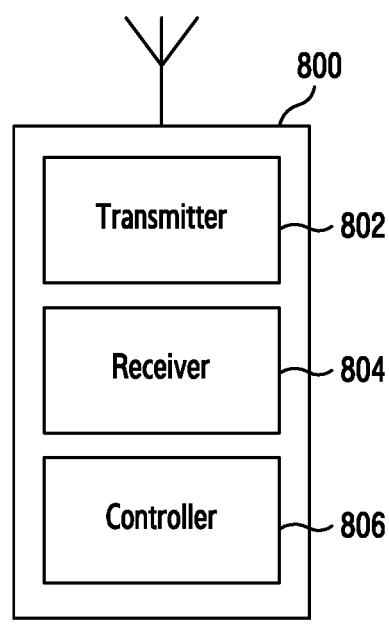
FIG. 15 illustrates the structure of a UE in accordance with an embodiment of the present disclosure.

FIG. 15 provides a schematic diagram of the structure of a UE 800 which is arranged to operate in accordance with the examples of the present disclosure described above. The UE includes a transmitter 802 arranged to transmit signals to the mmSC; a receiver 804 arranged to receive signals from the mmSC; and a controller 806 arranged to control the transmitter and receiver and to perform processing.

Although in FIGS. 14 and 15 the transmitter, receiver, and controller have been illustrated as separate elements, any single element or plurality of elements which provide equivalent functionality can be used to implement the examples of the present disclosure described above.

Figure 16:
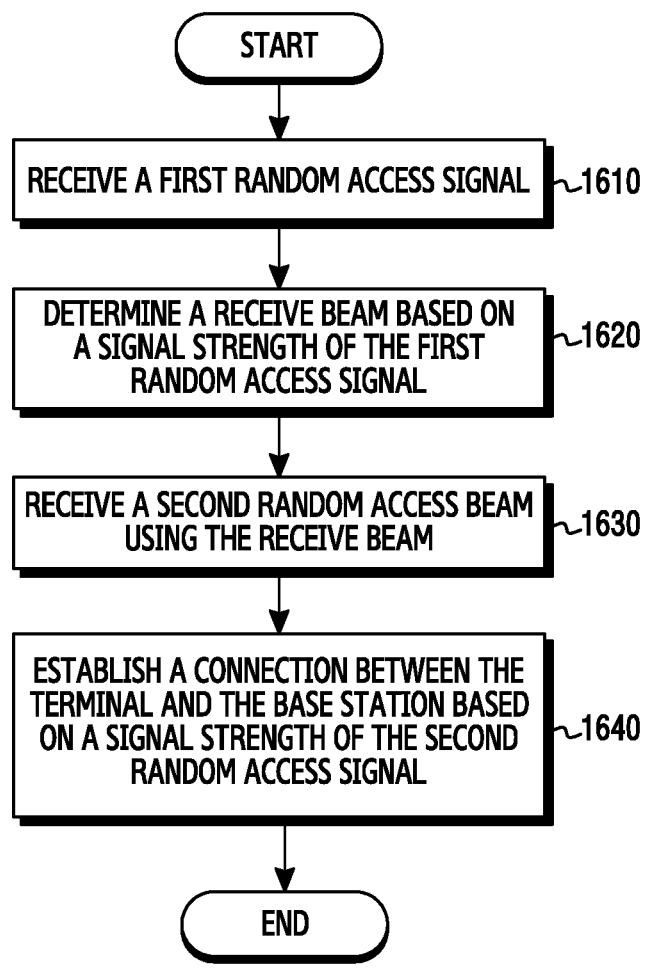
FIG. 16 illustrates a flow chart of a base station in accordance with an embodiment of the present disclosure.

FIG. 16 illustrates a flow chart of a base station in accordance with an embodiment of the present disclosure.

In step 1610, the base station receives a first random access signal. The base station receives, from a the first random access signal transmitted by a plurality of beams of the terminal according to a first sweep. For example, the plurality of beams of the terminal can comprise transmission beams each corresponding to each of the UE transmission beam indices as illustrated in FIG. 3.

In step 1620, the base station determines a receive beam based on a signal strength of the first random access signal. To do so, the base station can measure the signal strength of the first random access signal. For example, the base station can measure PDP value by a preamble of the first random access signal. According to an embodiment of the present disclosure, the base station can transmit, to at least one other base station, information regarding the signal strength of the first random access signal and receive, from the at least one other base station, an estimate of a location of the terminal or a selection of the receive beam, to determine the receive beam. Or, the base station can transmit, to a separate network component, information regarding the signal strength of the first random access signal and receive, from the separate network component, an estimate of a location of the terminal or a selection of the receive beam, to determine the receive beam. The estimate of the selection of the receive beam can be determined based on the strength of the first random access signal measured by the base station another signal strength of the first random access signal measured by the at least one other base station. When the base station has received the estimate of the location of the terminal, the base station can determine the receive beam based on the estimate of the location of the terminal. According to another embodiment of the present disclosure, the base station receives, from the at least one other base station, information regarding another signal strength of the first random access signal measured by the at least one other base station. The base station can estimate the location of the terminal based on the received information and the signal strength of the first random access signal which the base station itself has measured, and can determine the receive beam based on the estimated location of the terminal.

In step 1630, the base station receives a second random access signal using the determined receive beam. The base station receives, from the terminal, the second random access signal transmitted by the plurality of beams of the terminal according to a second sweep. The plurality of beams of the terminal used in the second sweep can be the same as those used in the first sweep.

In step 1640, the base station establishes a connection between the terminal and the base station based on a signal strength of the second random access signal. For example, if the signal strength of the second random access signal which the base station received using the determined received beam exceeds the threshold, the base station can establish a connection between the terminal and the base station.

According to various embodiments of the present disclosure, instead of determining a signal receive beam in step 1620, the base station can determine a subset of a plurality of receive beams which are available for the base station. In this case, the base station receives the second random access signal repeatedly using each of the plurality of receive beams in the subset in turn, and if the signal strength of the second random access signal with the specific beam used exceeds the threshold, the base station can establish the connection with the terminal using that beam. In contrast, if the signal strength of the second random access signal with the specific beam used is below the threshold, the base station can receive the second random access signal using another receive beam in the subset. The base station can establish the connection with the terminal by using the receive beam among the subset of the plurality of receive beams which can receive the second random access signal with a signal strength higher than the threshold. Or. The base station can establish the connection with the terminal by using the receive beam among the subset of the plurality of receive beams which can receive the second random access signal with a highest signal strength.

Figure 17:
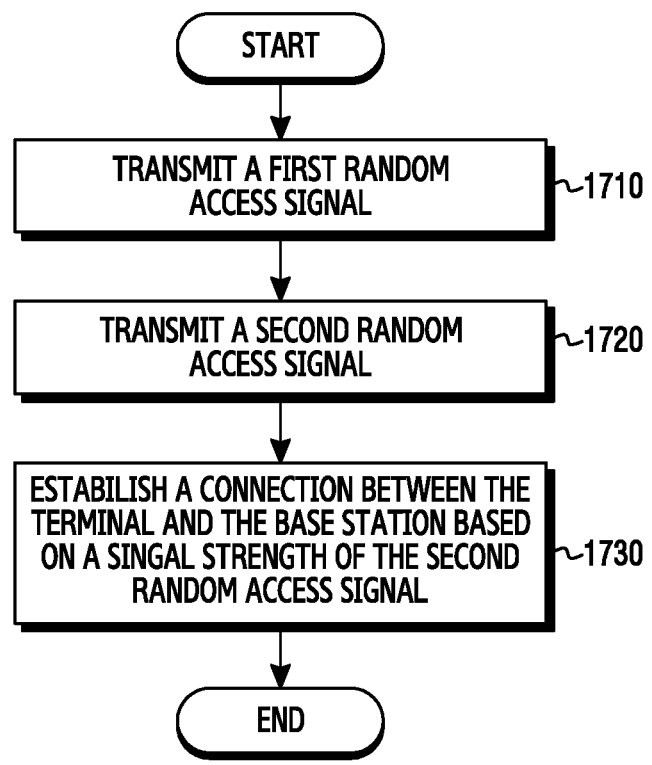
FIG. 17 illustrates a flow chart of a UE in accordance with an embodiment of the present disclosure.

FIG. 17 illustrates a flow chart of a UE in accordance with an embodiment of the present disclosure.

In step 1710, a terminal transmits a first random access signal. The terminal transmits, to a base station, the first random access signal using a plurality of beams according to a first sweep. For example, the plurality of beams of the terminal can comprise transmission beams each corresponding to each of UE transmission beam indices.

In step 1720, the base station transmits a second random access signal. The terminal transmits, to the base station, the second random access signal using the plurality of beams according to as second sweep. The plurality of beams of the terminal used in the second sweep can be the same as those used in the first sweep. According to an embodiment of the present disclosure, the second random access signal which the terminal has transmitted can be received by a receive beam of the base station, and the receive beam of the base station can be determined based on a signal strength of the first random access signal. In specific, the receive beam of the base station can be determined similarly as a description for the step 1620.

In step 1730, the terminal establishes a connection between the terminal and the base station based on a signal strength of the second random access signal. For example, the connection between the terminal and the base station can be established if the second random access signal which the terminal has transmitted is received by the determined receive bean of the base station with a signal strength higher than a threshold.

Throughout the description and claims of this specification, the words "comprise" and "contain" and variations of them mean "including but not limited to", and they are not intended to (and do not) exclude other components, integers or steps. Throughout the description and claims of this specification, the singular encompasses the plural unless the context otherwise requires. In particular, where the indefinite article is used, the specification is to be understood as contemplating plurality as well as singularity, unless the context requires otherwise.

Features, integers or characteristics described in conjunction with a particular aspect, embodiment or example of the disclosure are to be understood to be applicable to any other aspect, embodiment or example described herein unless incompatible therewith. All of the features disclosed in this specification (including any accompanying claims, abstract and drawings), and/or all of the steps of any method or process so disclosed, can be combined in any combination, except combinations where at least some of such features and/or steps are mutually exclusive. The disclosure is not restricted to the details of any foregoing embodiments. The disclosure extends to any novel one, or any novel combination, of the features disclosed in this specification (including any accompanying claims, abstract and drawings), or to any novel one, or any novel combination, of the steps of any method or process so disclosed.

The reader's attention is directed to all papers and documents which are filed concurrently with or previous to this specification in connection with this application and which are open to public inspection with this specification, and the contents of all such papers and documents are incorporated herein by reference.

The various embodiments of the present disclosure can also be implemented via computer executable instructions stored on a computer readable storage medium, such that when executed cause a computer to operate in accordance with any other the aforementioned embodiments.

Although the present disclosure has been described with an exemplary embodiment, various changes and modifications may be suggested to one skilled in the art. It is intended that the present disclosure encompass such changes and modifications as fall within the scope of the appended claims.

What is claimed is:

1. A method of operating a base station in a wireless communication system, the method comprising:
receiving, from a terminal, at least one of first random access signals transmitted through transmit beams of the terminal;
identifying at least one receive beam of the base station corresponding to a location of the terminal, wherein the location of the terminal is identified based on a signal strength for the transmit beams measured by the base station based on the at least one of the first random access signals, and a signal strength for transmit beams measured by at least two other base stations based on the at least one of the first random access signals;
receiving, from the terminal based on the identified at least one receive beam, at least one of second random access signals transmitted through the transmit beams of the terminal; and
establishing a connection with the terminal based on a signal strength for the at least one of the second random access signals,
wherein the at least two other base stations comprise a first base station and a second base station,
wherein the location of the terminal is identified based on:
a beam index of a transmit beam of the terminal having a highest signal strength measured by the base station among the transmit beams;
a beam index of a transmit beam of the terminal having a highest signal strength measured by the first base station among the transmit beams; and
a beam index of a transmit beam of the terminal having a highest signal strength measured by the second base station among the transmit beams, and
wherein a respective signal strength corresponds to a power density profile (PDP).

2. The method of claim 1, further comprising:
receiving, from the at least two other base stations, information regarding the signal strength for the transmit beams measured by the at least two other base stations.

3. The method of claim 2, wherein the base station and the at least two other base stations are directly connected via backhaul links for communicating the information.

4. The method of claim 1, wherein the receiving of the second random access signals comprises:
receiving, from the terminal, the second random access signals based on each of the identified at least one receive beam of the base station in turn.

5. The method of claim 1, further comprising:
synchronizing a transmission of the first random access signals according to a synchronization signal transmitted by the base station or the at least two other base stations.

6. The method of claim 1, further comprising:
receiving, from a separate network component, information on the identified at least one receive beam of the base station.

7. The method of claim 1, wherein the establishing of the connection with the terminal comprises:
identifying whether the signal strength for the at least one of the second random access signals received based on a first receive beam among the identified at least one receive beam of the base station exceeds a threshold, or is below the threshold;
if the signal strength for the at least one of the second random access signals received based on the identified at least one receive beam exceeds the threshold, establishing the connection with the terminal; and
if a signal strength for all of the second random access signals received based on the identified at least one receive beam is below the threshold, receiving, from the terminal based on a second receive beam among the identified at least one receive beam of the base station, third random access signals transmitted through the transmit beams, and in response to the signal strength for at least one of the third random access signals exceeding the threshold, establishing the connection with the terminal.

8. A base station in a wireless communication system, the base station comprising:
   at least one transceiver; and
   at least one processor, operatively coupled to the at least one transceiver and configured to:
      receive, from a terminal, at least one of first random access signals transmitted through transmit beams,
      identify at least one receive beam of the base station corresponding to a location of the terminal, wherein the location of the terminal is identified based on a signal strength for the transmit beams measured by the base station based on the at least one of the first random access signals, and a signal strength for transmit beams measured by at least two other base stations based on the at least one of the first random access signals,
      receive, from the terminal based on the identified at least one receive beam, at least one of second random access signals transmitted through the transmit beams, and
      establish a connection with the terminal based on a signal strength for the at least one of the second random access signals,
   wherein the at least two other base stations comprise a first base station and a second base station,
   wherein the location of the terminal is identified based on:
      a beam index of a transmit beam of the terminal having a highest signal strength measured by the base station among the transmit beams;
      a beam index of a transmit beam of the terminal having a highest signal strength measured by the first base station among the transmit beams; and
      a beam index of a transmit beam of the terminal having a highest signal strength measured by the second base station among the transmit beams, and
      wherein a respective signal strength corresponds to a power density profile (PDP).

9. The base station of claim 8, wherein the at least one transceiver is further configured to receive, from the at least two other base stations, information regarding the signal strength for the transmit beams measured by the at least two other base stations.

10. The base station of claim 9, wherein the base station and the at least two other base stations are directly connected via backhaul links for communicating the information.

11. The base station of claim 8, wherein the at least one transceiver is further configured to receive, from the terminal, the second random access signals based on each of the identified at least one receive beam of the base station in turn.

12. The base station of claim 8, wherein the at least one transceiver is further configured to synchronize a transmission of the first random access signals according to a synchronization signal transmitted by the base station or the at least two other base stations.

13. The base station of claim 8, wherein the at least one transceiver is further configured to receive, from a separate network component, information on the identified at least one receive beam of the base station.

14. The base station of claim 8, wherein the at least one processor is further configured to identify whether the signal strength for the at least one of the second random access signals received based on a first receive beam among the identified at least one receive beam of the base station exceeds a threshold, or is below the threshold, and
   wherein the at least one transceiver is further configured to:
      if the signal strength for the at least one of the second random access signals received based on the identified at least one receive beam exceeds the threshold, establish the connection with terminal, and
      if a signal strength of all for the second random access signals received based on the identified at least one receive beam is below the threshold, receive, from the terminal based on a second receive beam among the identified at least one receive beam of the base station, third random access signals transmitted through the transmit beams, and in response to a signal strength of at least one for the third random access signals exceeding the threshold, establish the connection with the terminal.

15. A terminal in a wireless communications network comprising:
   at least one transceiver; and
   at least one processor, operatively coupled to the at least one transceiver and configured to:
      transmit, to a base station and at least two other base stations, first random access signals based on transmit beams of the terminal,
      transmit, to the base station and the at least two other base stations, second random access signals based on transmit beams of the terminal, and
      establish a connection with the base station in response to a signal strength of the at least one of the second random access signals measured by the base station exceeding a threshold,
      wherein at least one of the second random access signals is received though at least one receive beam of each of the base station and the at least two other base stations,
   wherein the at least one receive beam corresponds to a location of the terminal,
   wherein the location of the terminal is identified based on a signal strength for the transmit beams measured by the base station based on the first random access signals, and a signal strength for the transmit beams measured by at least two other base stations based on the first random access signals,
   wherein the at least two other base stations comprise a first base station and a second base station,
   wherein the location of the terminal is identified based on:
      a beam index of a transmit beam of the terminal having a highest signal strength measured by the base station among the transmit beams;
      a beam index of a transmit beam of the terminal having a highest signal strength measured by the first base station among the transmit beams; and
      a beam index of a transmit beam of the terminal having a highest signal strength measured by the second base station among the transmit beams, and wherein a respective signal strength corresponds to a power density profile (PDP).

\* \* \* \* \*